US009106452B2

(12) United States Patent
Basart

(10) Patent No.: US 9,106,452 B2
(45) Date of Patent: Aug. 11, 2015

(54) CLOUD VOIP SYSTEM WITH BYPASS FOR IP MEDIA

(75) Inventor: Edwin J. Basart, Los Altos, CA (US)

(73) Assignee: Shoretel, Inc., Sunnyvale, CA (US)

( * ) Notice: Subject to any disclaimer, the term of this patent is extended or adjusted under 35 U.S.C. 154(b) by 698 days.

(21) Appl. No.: 12/980,847

(22) Filed: Dec. 29, 2010

(65) Prior Publication Data

US 2011/0096762 A1    Apr. 28, 2011

Related U.S. Application Data

(63) Continuation-in-part of application No. 12/651,330, filed on Dec. 31, 2009, now Pat. No. 8,483,045, which is a continuation-in-part of application No. 12/053,809, filed on Mar. 24, 2008, now Pat. No. 8,451,714.

(51) Int. Cl.
| | |
|---|---|
| *H04L 12/801* | (2013.01) |
| *H04L 12/26* | (2006.01) |
| *H04L 12/66* | (2006.01) |
| *H04L 12/803* | (2013.01) |
| *H04L 12/64* | (2006.01) |
| *H04M 7/00* | (2006.01) |

(52) U.S. Cl.
CPC ............ *H04L 12/66* (2013.01); *H04L 12/6418* (2013.01); *H04L 43/08* (2013.01); *H04L 43/0852* (2013.01); *H04L 47/11* (2013.01); *H04L 47/122* (2013.01); *H04M 7/0057* (2013.01)

(58) Field of Classification Search
None
See application file for complete search history.

(56) References Cited

U.S. PATENT DOCUMENTS

| | | |
|---|---|---|
| 6,510,219 B1 | 1/2003 | Wellard et al. |
| 6,519,218 B2 | 2/2003 | Sano |
| 6,678,267 B1 | 1/2004 | Anandakumar et al. |
| 6,868,080 B1 | 3/2005 | Umansky et al. |
| 6,876,627 B1 | 4/2005 | Rao |
| 6,879,582 B1 | 4/2005 | Dhara et al. |
| 6,973,091 B1 | 12/2005 | Hester |
| 7,103,067 B1 | 9/2006 | Singh et al. |
| 7,197,029 B1 | 3/2007 | Osterhout et al. |
| 7,215,643 B2 | 5/2007 | Mussman et al. |
| 7,359,702 B2 | 4/2008 | Kirkpatrick |
| 7,424,006 B1 | 9/2008 | Schlesener et al. |
| 7,564,835 B1 | 7/2009 | Grabelsky et al. |
| 7,564,840 B2 | 7/2009 | Elliott et al. |
| 7,613,170 B1 | 11/2009 | Grabelsky et al. |

(Continued)

OTHER PUBLICATIONS

International Search Report, PCT/US2010/062257, Feb. 7, 2011, 7 Pages.

*Primary Examiner* — Jutai Kao
(74) *Attorney, Agent, or Firm* — Patent Law Works LLP

(57) ABSTRACT

The cloud computing VoIP system includes a software as a service (SaaS) site and one or more additional sites. The SaaS site includes a gateway and a call manager and is coupled for communication across an IP network and the PSTN. The call manager includes a media monitoring module, a bypass module, a PSTN control module and a GUI module. The SaaS site handles and controls voice and video calls over the IP network and the PSTN for endpoints at the one or more additional sites. In another embodiment, the cloud computing VoIP system is also coupled to a cellular network and the endpoints include an associated cellular phone. The cloud computing VoIP system also includes a method for falling back to a secondary network, namely the cellular network, when there is insufficient quality on a primary network.

24 Claims, 30 Drawing Sheets

(56) References Cited

U.S. PATENT DOCUMENTS

| | | |
|---|---|---|
| 7,707,592 B2 | 4/2010 | Wesslen et al. |
| 7,715,413 B2 | 5/2010 | Vaziri et al. |
| 7,760,711 B1 * | 7/2010 | Kung et al. ............... 370/352 |
| 7,782,901 B2 | 8/2010 | Wang |
| 7,856,007 B2 | 12/2010 | Corcoran |
| 7,865,172 B2 | 1/2011 | Blair et al. |
| 7,870,290 B2 | 1/2011 | Kruger et al. |
| 7,924,825 B2 | 4/2011 | Dowling et al. |
| 8,149,787 B2 | 4/2012 | Gazzard |
| 8,396,058 B2 | 3/2013 | Perkins et al. |
| 2001/0005382 A1 | 6/2001 | Cave et al. |
| 2002/0101860 A1 | 8/2002 | Thornton et al. |
| 2004/0022237 A1 | 2/2004 | Elliot et al. |
| 2004/0114515 A1 | 6/2004 | Kim |
| 2004/0190497 A1 | 9/2004 | Knox |
| 2004/0223498 A1 | 11/2004 | Sanderson et al. |
| 2005/0174935 A1 | 8/2005 | Segel |
| 2005/0243820 A1 | 11/2005 | Chen |
| 2005/0272465 A1 | 12/2005 | Ahmavaara et al. |
| 2006/0050686 A1 | 3/2006 | Velez-Rivera et al. |
| 2006/0067513 A1 | 3/2006 | Maytal et al. |
| 2006/0095199 A1 | 5/2006 | Lagassey |
| 2006/0182255 A1 * | 8/2006 | Luck et al. ............... 379/220.01 |
| 2007/0058790 A1 | 3/2007 | Wynn |
| 2007/0076622 A1 * | 4/2007 | Mukherjee ............... 370/252 |
| 2007/0121604 A1 | 5/2007 | Chandra et al. |
| 2007/0183394 A1 * | 8/2007 | Khandelwal et al. ......... 370/352 |
| 2007/0223444 A1 | 9/2007 | Foo et al. |
| 2007/0232237 A1 | 10/2007 | Croak et al. |
| 2008/0005156 A1 | 1/2008 | Edwards et al. |
| 2008/0010672 A1 | 1/2008 | Buffmire |
| 2008/0049650 A1 | 2/2008 | Coppage et al. |
| 2008/0182616 A1 | 7/2008 | Connors et al. |
| 2008/0207126 A1 * | 8/2008 | Grushkevich et al. ....... 455/41.2 |
| 2009/0111406 A1 | 4/2009 | Posti et al. |
| 2009/0141682 A1 | 6/2009 | Zou et al. |
| 2012/0063345 A1 * | 3/2012 | Krzanowski et al. ......... 370/252 |
| 2012/0236844 A1 * | 9/2012 | Hester ............... 370/352 |

\* cited by examiner

CLOUD VOIP SYSTEM WITH BYPASS FOR IP MEDIA

CROSS-REFERENCE TO RELATED APPLICATIONS

This application is a continuation-in-part of U.S. patent application Ser. No. 12/651,330 entitled "User Activated Bypass For IP Media," filed Dec. 31, 2009, which is a continuation-in-part of U.S. patent application Ser. No. 12/053,809, entitled "PSTN Bypass For IP Media," filed Mar. 24, 2008, both of which are incorporated herein by reference in their entirety.

BACKGROUND OF THE INVENTION

1. Field of the Invention

The present invention relates to telephony such as that using Voice over Internet Protocol (VoIP). In particular, the present invention relates to a Voice over Internet Protocol system where call control and management resources are located in the cloud and offered in a cloud computing architecture. Still more particularly, the present invention relates to cloud computing VoIP system that includes a method for falling back to a secondary network when there is insufficient quality on a primary network.

2. Description of the Background Art

Long distance data communication became extremely popular with the acceptance of the Internet Protocols and the Internet. Commonly, the Internet was used for data consisting of email or files for web browsing, but not for voice telephone calls. As IP networks improved, telephone calls became an addition to Internet traffic. But there are problems using the Internet for telephone calls, as the IP technology breaks up a call into packets, which may have to compete with other data, unlike the public switched telephone network (PSTN), which uses a dedicated, circuit-switched network connection for a call. Once a telephone call is established, the PSTN provides calls with very understandable speech and with very high reliability. IP networks must have high enough bandwidth to pass calls, and in addition have either a priority mechanism to favor voice traffic or enough extra bandwidth to avoid losing or delaying packets, which degrade the quality and understandability of a voice call.

IP telephony is used because it is frequently lower cost than PSTN calls, and for businesses, equipment for IP telephony may be lower cost than previously used circuit-switched equipment. IP telephony equipment may also have lower maintenance cost than circuit-switched equipment. However, for small businesses, the cost of even existing VoIP phone systems and equipment can be out of reach.

Advanced telephony features can be provided at no extra cost from an IP network, as features are just packets, whereas circuit-switched networks tend to charge extra for features. An example of an advanced set of features (called advanced features from here on out) is an IP phone at a remote location from the main business. The IP phone uses the IP network for a range of advanced features such as transfer, conference and directory listing. The phone also uses the IP network for its graphical user interface (GUI). As the user looks up another user in the directory, the graphical user interface can display the presence information of the other user—for instance, whether the user is on the phone or out of the office. Features such as transfer and conference may be purchasable at extra cost from the PSTN, but more advanced features such as the graphical user interface may not be available at all, giving the IP phone an advantage over previous circuit-switched technology. For example, the GUI can also be used to indicate whether the user has voice mail, and allow the user to select and listen to a particular message. On low quality IP networks the message can be retrieved via file transfer and then played locally on the IP phone, providing high voice quality. Similarly, Instant Messaging (IM) and Text Messaging—sometimes implemented with Short Message Service (SMS)—are features that can be incorporated into an IP phone but are not offered on the PSTN.

Another advanced feature example is an auto attendant at a remote location from the main business. The remote location uses PSTN lines for local numbers, allowing customers to make low-cost local calls to contact the business. A customer calling the remote location is connected to an auto attendant offering destination options. By connecting the remote office to the main business with IP telephony, the customer can request an operator, and the operator can be located as the main business. The operator can take the call on the IP network, and then transfer the call to a user at the remote location using the IP network. The PSTN call remains connected to the remote office and requires no additional extra-cost features from the PSTN.

In contrast to the plain old telephone system (POTS) that is independently powered and operational regardless of IP connection quality issues, the reliability of VoIP systems is directly impacted by the availability of the IP network. If the IP network is not available or has poor quality of service, VoIP systems are unable to make calls. The need for reliability is more acute for small business that have only a single connection path to the IP network that is used for all their communication needs.

Thus, there is a need for a method for providing fault tolerance for IP telephone network.

SUMMARY OF THE INVENTION

The present invention overcomes the deficiencies and limitations of the prior art by providing a VoIP system where call control and management resources are located in the cloud and offered in a cloud computing architecture. In one embodiment, the cloud computing VoIP system includes a Software as a Service (SaaS) or shared site, and one or more additional sites such as a first site and a second site. The SaaS site includes a gateway and a call manager and is coupled for communication across an IP network and the PSTN. The call manager includes a media monitoring module, a bypass module, a PSTN control module and a GUI module. The SaaS site handles and controls voice and video calls over the IP network and the PSTN for endpoints at the first and second site. This configuration is particularly advantageous because a single SaaS site provides VoIP services including advanced call features to a plurality of other sites, thereby reducing the cost of operating a VoIP system even further.

In another embodiment, the cloud computing VoIP system is also coupled to a cellular network and the endpoints include an associated cellular phone. In such a configuration, the cloud computing VoIP system also includes a method for falling back to a secondary network, namely the cellular network, when there is insufficient quality on a primary network. In particular, the present invention uses a cellular network as a fallback for the IP media when the IP network cannot pass the media acceptably and while continuing to use the IP network for call control and other features. In yet another embodiment, the method falls back to the secondary network for both IP media and call control. For example, the cellular network is used for media when the IP network is unavailable and the data channel (SMS or MMS) is used for call control. The present invention also includes a variety of methods including a method for falling back to a secondary network and a method for dynamically switching between a primary and a secondary network to ensure call quality.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
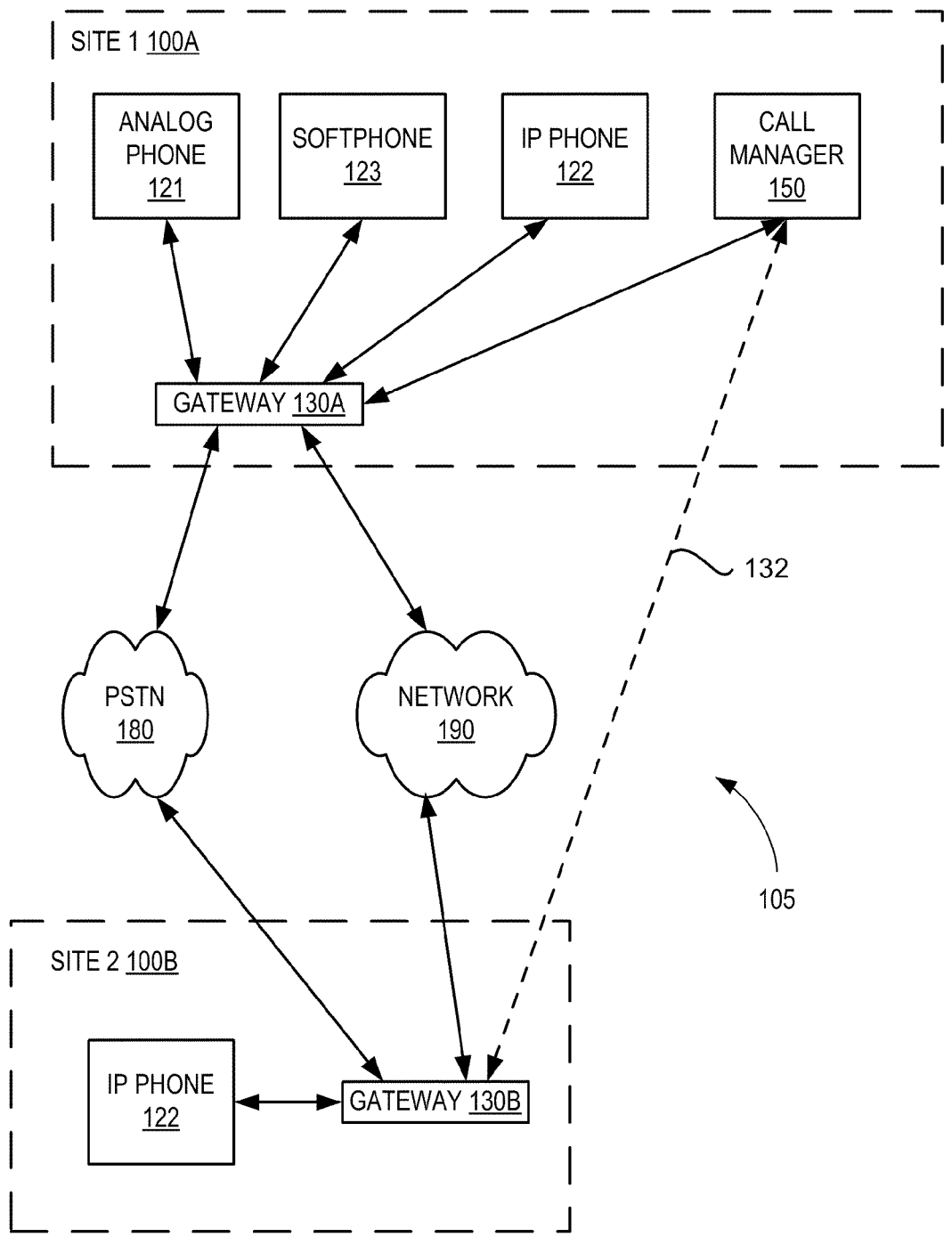
FIG. 1 is a high-level block diagram illustrating a functional view of a distributed telephony system according to one embodiment of the present invention.

A cloud computing VoIP system and a method for falling back to a secondary network to ensure call quality is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to user interfaces and particular hardware. However, the present invention applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

System Overview

Enterprises often have several offices or call centers that are located in a plurality of disparate locations. To interconnect all of these sites, enterprise telephony systems have been developed. Enterprise telephony systems, which comprise a set of voice switches and servers, offer enterprise applications enabled by the integration of computer systems with telephony services. The software that supports the computer-integrated functionality is generally implemented as a client-server environment in which the participants or clients (distributed telephony users) communicate with a server. Computer-integrated features rely not only on a server's application platform but also on the availability of the network that connects the switches, servers and application services.

FIG. 1 illustrates a block diagram of a distributed telephony system 105 according to one embodiment of the present invention. The illustrated embodiment of the distributed telephony system 105 includes a first site 100A and a second site 100B. As used herein, a site represents a grouping of resources. In the illustrated embodiment, the two sites 100A, 100B are communicatively coupled via a PSTN network 180 and an IP network 190. One skilled in the art will note that sites 100A, 100B can be physically distinct from each other or merely topology-related groupings that are not in physically distinct locations. The system 105 of FIG. 1 is used only by way of example. While FIG. 1 illustrates two sites, the present invention applies to any system architecture containing one or more sites.

The first site 100A includes a first gateway 130A, three endpoints (analog phone 121, IP phone 122, and softphone 123), and a device such as a server running a call manager software application 150. The first gateway 130A represents a Voice over Internet Protocol (VoIP) device to which a number of endpoints can be coupled, such as analog phones 121, IP phones 122, and softphones 123. In the illustrated embodiment, the first gateway 130A is coupled to the network 190. The first gateway 130A is also coupled to the public switched telephone network (PSTN) 180 via an analog or digital trunk line (e.g., a T1 or E1 interface). In the illustrated configuration, the first gateway 130A provides an interface for calls originating from or terminating on the PSTN 180.

An endpoint enables a user to carry on a phone call. Although in the illustrated embodiment the first site 100A has three endpoints (one analog phone 121, one IP phone 122A, and one softphone 123), in other embodiments the first site 100A has different numbers and types of endpoints. An endpoint may be an IP phone, a softphone on a personal computer, a softphone running on a mobile device, a computer running a telephony application such as voice mail or a gateway. An endpoint is coupled to the gateway 130A. Each of the endpoints can also include a display device (not shown) that is used in conjunction with the phone of the endpoint.

An endpoint has a user interface to send data to and receive data from a user. The analog phone 121 has, for example, a Telephone User Interface (TUI) that receives input data from a key pad and sends data to the gateway. The IP phone 122 has, for example, both a TUI and a graphical user interface that sends data through a display device associated with the IP phone 122. In one embodiment, the IP phone's graphical user interface also receives data from a touch screen display device associated with the IP phone 122. The softphone 123 has, for example, a software application that runs on a computer and sends data through a display device and a speaker and receives data through a microphone, a keyboard, and a pointing device.

A device or server, such as a computer, running a call manager software application 150 (call manager 150), controls one or more endpoints with which it is associated. Call manager 150 offers a user an interface through which he can perform call-related functions. While shown and operational as a separate module in this embodiment and FIG. 1, those skilled in the art will recognize that in other embodiments, the call manager 150 may be operational as part of the gateway 130.

The call manager 150 can control a gateway 130B remote from the site 100A as indicated by dash line 132.

One skilled in the art will appreciate that additional networking devices (not shown) can be added to the first site 100A, for example, if needed to support additional endpoints, servers 110 or other systems. One skilled in the art will also recognize that numerous configurations of switches 130 and communications links are contemplated. For example, PSTN links can be coupled to multiple switches 130 at several points within the topology and soft-switches 130 can also be used.

In one embodiment, the gateway 130A is configured to implement features or functions of the present invention. The gateway 130A includes a processor. The processor can be a conventional processing device, such as a general-purpose microprocessor. The gateway 130A also includes a memory. The memory also includes software and routines (not shown) conventionally used to operate a gateway 130A in a VoIP telephony system. For example, the gateway 130A includes software routines for performing call monitoring, transferring calls, placing calls on hold, establishing hunt groups, automated attendant functions, etc. The memory also includes program instructions or functional units that implement the features of the present invention. The gateway 130A also includes a call manager (See also FIG. 8).

The second site 100B similarly includes an endpoint (IP phone 122) and a second gateway 130B. The configuration of the second site 100B demonstrates that a call manager is not required for each site. The second gateway 130B of the second site 100B can be managed by call manager 150 that is illustrated in the first site 100A as denoted by dashed line 132. A call can involve more than one gateway 130A, 130B. For example, a call that originates from the PSTN 180 and terminates on an endpoint that is communicatively coupled to second gateway 130B of the second site 100B involves two gateways: a first gateway 130A of the first site 100A and second gateway 130B of the second site 100B. In addition, each gateway 130A, 130B can be managed by a different call manager 150. A gateway 130A, 130B may not be required for a call; a call from one IP endpoint to another requires only the call manager 150 and the endpoints.

In one embodiment of the present invention, the network 190 is a partially public or a wholly public network such as the Internet. The IP network is preferably a wide area network. The IP network 190 can also be a private network or include one or more distinct or logical private networks (e.g., virtual private networks or wide area networks). Additionally, the communication links to and from the network 190 can be wire line or wireless (i.e., terrestrial- or satellite-based transceivers). In one embodiment of the present invention, the network 190 is an IP-based wide or metropolitan area network.

Basic Fallback Example

Figure 2A:
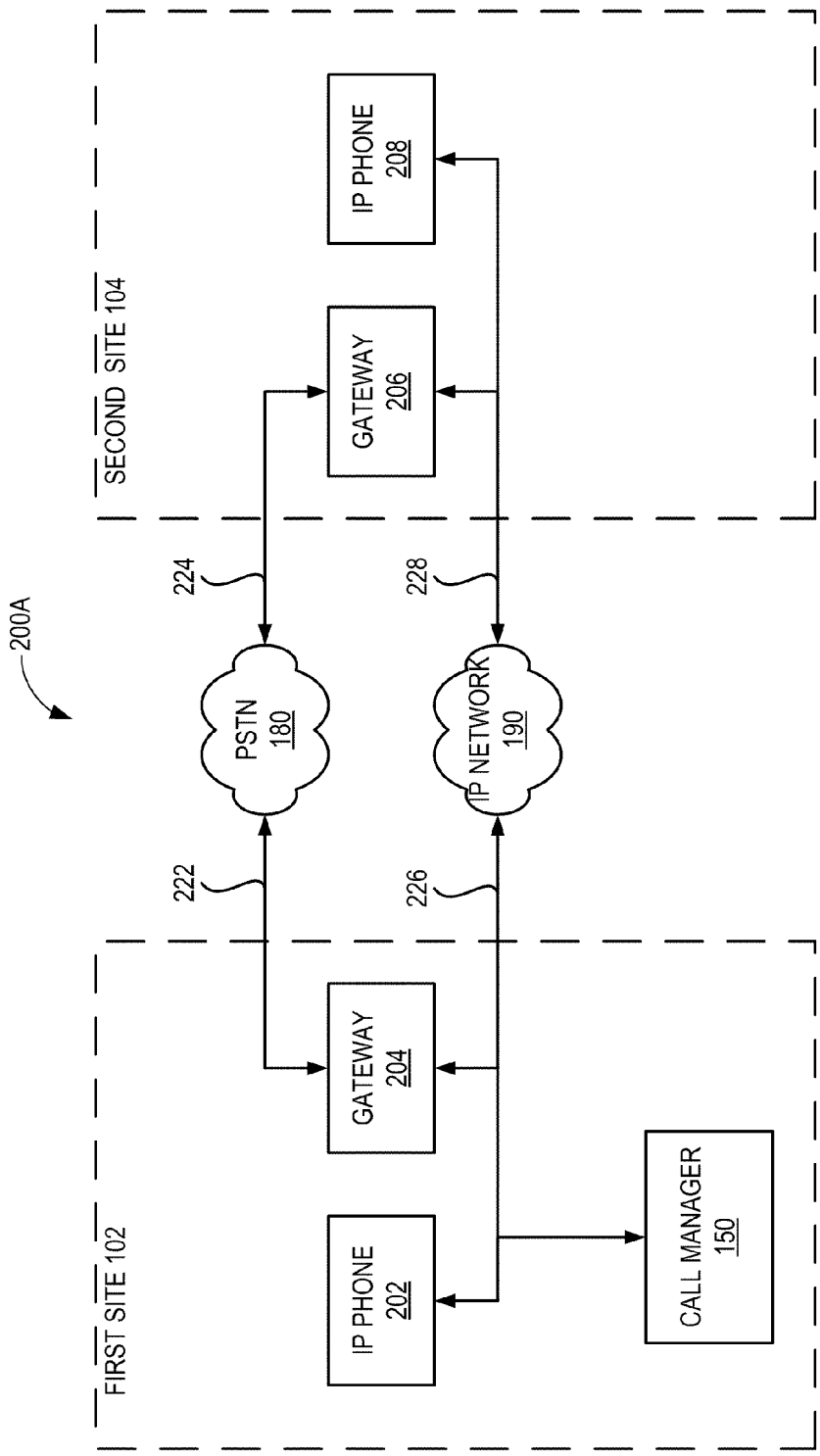
FIGS. 2A-2G are block diagrams illustrating a system having a first site and a second site configured according to different embodiments of the present invention.

Referring now to FIGS. 2A-2G, 3 and 4, a first, basic embodiment 200A of the present invention is described. FIG. 2A illustrates an example configuration 200A of a first site 102 coupled to a second site 104 by both an IP network 190 and a PSTN 180. The first site 102 further comprises an IP phone 202, a gateway 204 and a call manager 150 coupled by a signal line 226 to the IP network 190. The gateway 204 of the first site 102 is also coupled to the PSTN 180 by a signal line 222. A gateway 204 is a device that can interconnect the PSTN 180 to an IP network 190. A common use of a gateway is to enable IP phones to make calls to the PSTN or vice versa. Calls are set up by the call manager 150, a call control process that sets up and controls calls, and may also implement advanced features mentioned previously. While shown as the call manager 150, call control can be anywhere on the IP network 190—at any site or at another separate location as will be described for other embodiments in FIGS. 2B, 2C, 5-7 and 10 in which call control is embedded in phones or gateways for single call control for all devices or a peer to peer form. In one embodiment, call control is software that may run in the gateway 204 or in another embodiment, an external piece of hardware that may be a dedicated device or a computer.

While the present invention will now be described in the context of two sites 102, 104 and two IP phones 202, 208, the present invention is applicable to two or more sites since the technique works for any number of sites pair wise and can be made to work for 3-way and n-way conferencing.

The second site 104 includes a gateway 206 and IP phone 208 coupled to the IP network 190 by signal line 228. The gateway 206 of the second site 104 is also coupled to the PSTN 180 by signal line 224. Those skilled in the art will recognize that FIG. 2A illustrates a very simple configuration and that either site 102, 104 may include any number of gateways having additional couplings to other networks and additional endpoints. The use of the two endpoints, IP phone 202 and IP phone 208, is for convenience and ease of understanding, and more typical architectures will include tens or even hundreds of endpoints at each site. Those skilled in the art will recognize that each site 102, 104 may also include any other components conventionally included in a distributed IP telephony system.

In an IP environment calls are placed between endpoints 202, 208. When a user makes a call by dialing a number from IP endpoint 202 the destination IP endpoint 208 will be contacted with a message indicating an incoming call. If the destination accepts the call, the endpoints 202, 208 exchange media address information and then send media to each other, creating a call between the endpoints. Media in this case means the voice portion of the call, and the media address is the where the sending endpoint sends the media for the call—and where the destination endpoint is to listen (In practice, it may be the media address of where the endpoint wishes to listen.). For illustration, a common implementation for sending voice on the IP network 190 is RTP (Real Time transport Protocol, IETF RFC 1889, January 1996). In this protocol the media address information is an IP port number, and voice—called media in an IP context—is placed in the IP packet along with the port number. Those skilled in the art will recognize then media may also include video or other still images transferred between the endpoints. Those skilled in the art will recognize that in certain embodiments, the IP network 190 is a wireless network at a particular site. The wireless network can be either inside the building or premises at the site or an external service provider's wireless network. In any of these configurations, the network is wireless but an IP network.

Figure 2B:
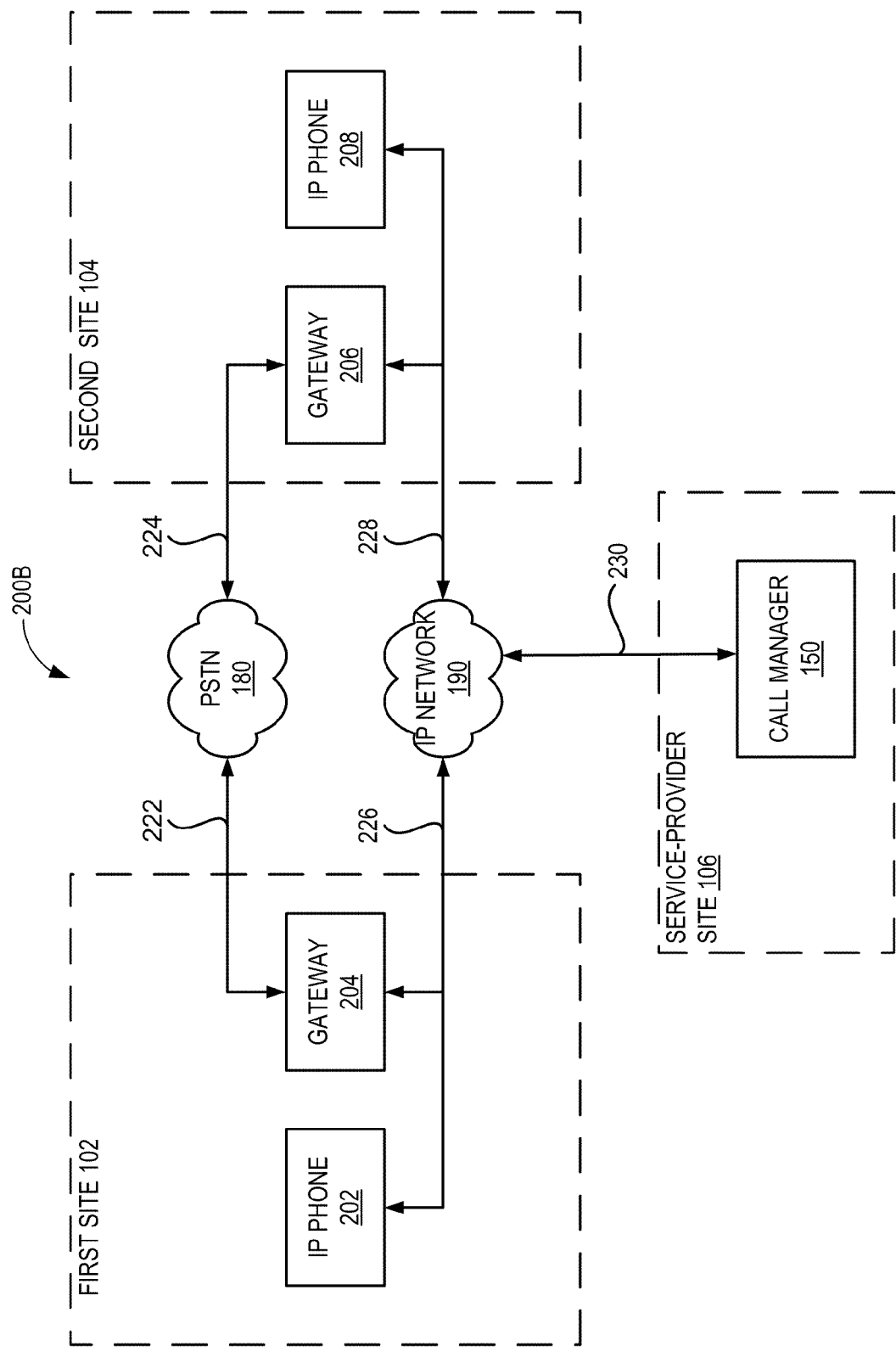

Referring now to FIG. 2B, a second embodiment of a system 200B having the first site 102, the second site 104 and a third site, a service-provider site 106 will be described. This second embodiment of a system 200B includes similar components to the first embodiment of the system 200A described above so that description will not be repeated here. Like reference numerals have been used for like components with similar functionality. However, this embodiment of the system 200B adds the service-provider site 106 that includes the call manager 150. The call manager 150 provides the same functionality as has been described above but is now located in the service-provider site 106 rather than the first site 102. The call manager 150 is coupled by signal line 230 to the IP network 190. FIG. 2B depicts the embodiment where call control is "in the cloud" as a service on the IP network 190.

Figure 2C:
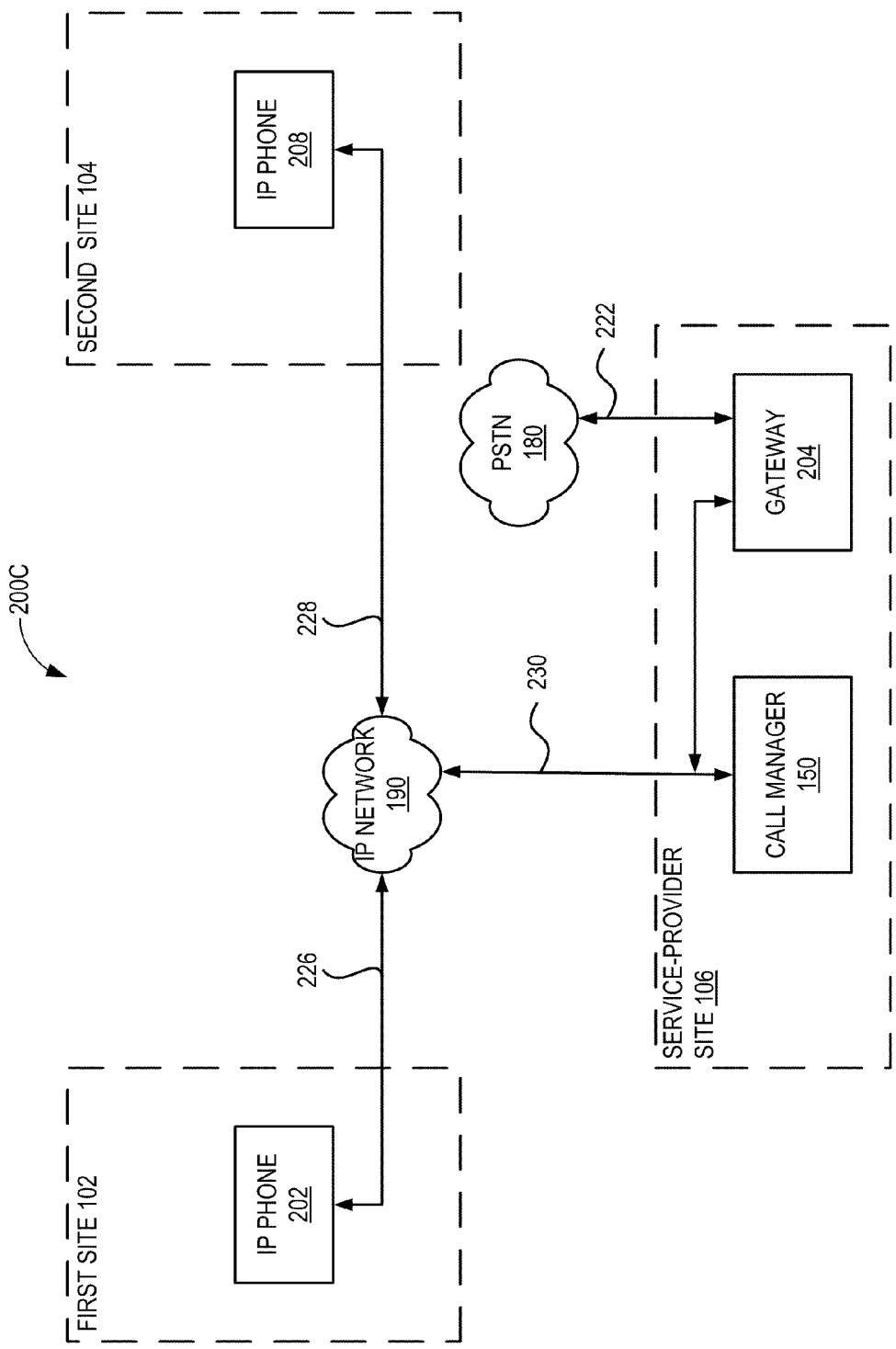

Referring now to FIG. 2C, a third embodiment of a system 200C having the first site 102, the second site 104 and a third site, a service-provider site 106 will be described. This third embodiment of a system 200C includes similar components to the first embodiment of the system 200A described above so again that description will not be repeated here. Like reference numerals have been used for like components with similar functionality. However, the third embodiment of the system 200C depicts an example topology where the third site 106 includes the call manager 150 and a gateway 204. The call manager 150 is coupled to the IP network 190 by signal line 230. The gateway 204 is also coupled to the IP network 190 by signal line 230. Additionally, the gateway 204 is coupled by signal line 222 to the PSTN 180. In this embodiment, the need for a gateway at each site 102 and 104 is obviated. The call manager cooperates with the gateway 204 to establish, set up and switch over the calls from the IP network 190 to the PSTN 180. The gateway 204 is coupled by signal line 222 to the PSTN 180 and can establish a PSTN call and set up the endpoints 202 and 208.

Figure 2D:
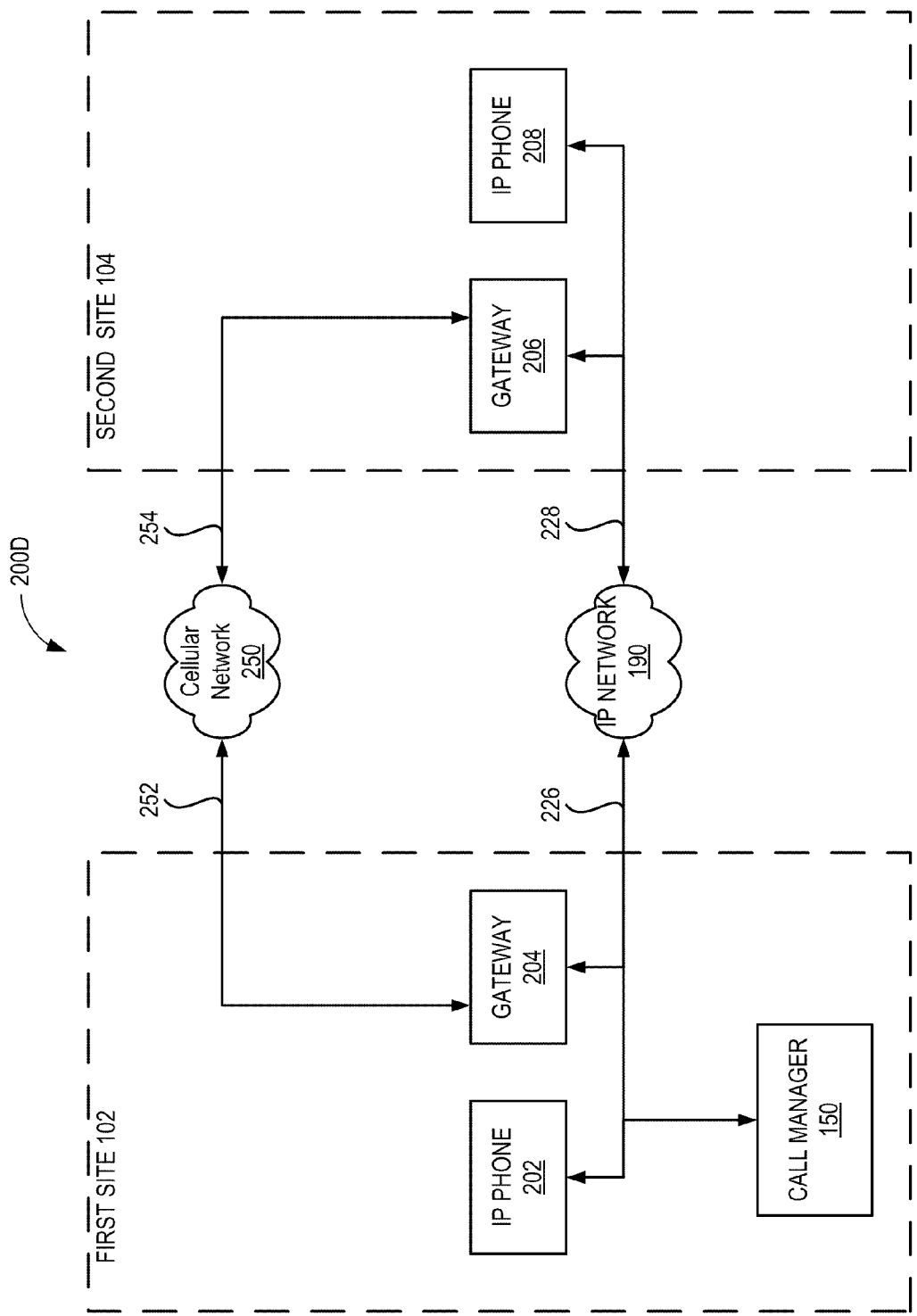

Referring now to FIG. 2D, a fourth embodiment of a system 200D having the first site 102 and the second site 104 will be described. This fourth embodiment of the system 200D includes similar components to the first embodiment of the system 200A described above so again that description will not be repeated here. Like reference numerals have been used for like components with similar functionality. However, the fourth embodiment of the system 200D depicts an example topology including a cellular network 250 rather than PSTN 180. In this embodiment, the cellular network 250 serves as the secondary network for bypassing the IP network 190 for the audio portion of the call. The cellular network 250 is coupled by signal line 252 to the gateway 204 of the first site 102. Similarly, the cellular network 250 is coupled by signal line 254 to the gateway 204 of the second site 104.

Figure 2E:
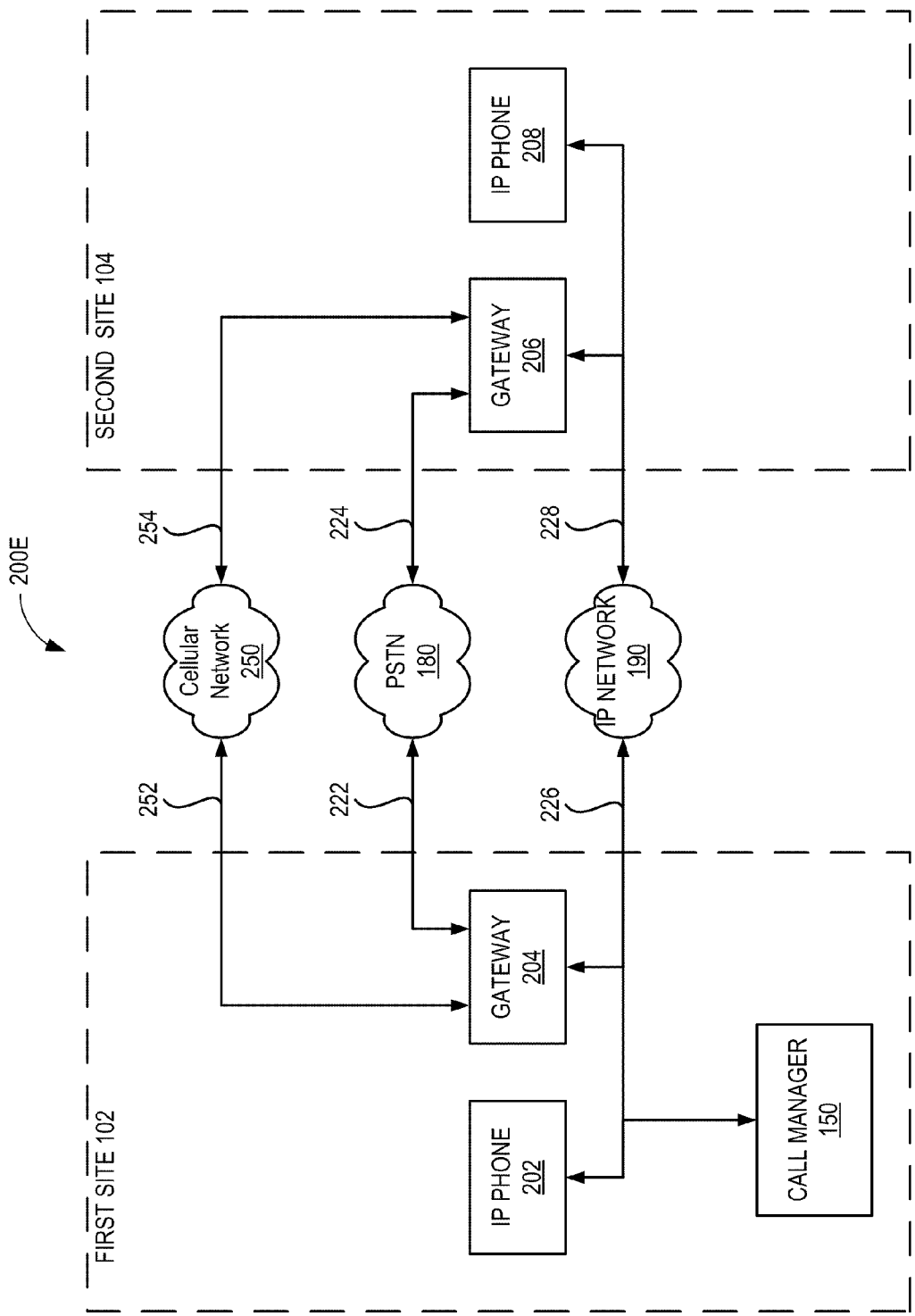

Referring now to FIG. 2E, a fifth embodiment of a system 200E having the first site 102 and the second site 104 will be described. This fifth embodiment of the system 200E includes similar components to the first and fourth embodiments of the system 200A, 200D described above so again that description will not be repeated here. Like reference numerals have been used for like components with similar functionality. However, the fifth embodiment of the system 200D depicts an example topology including both a PSTN 180 and a cellular network 250. Alternately, the PSTN 180 or the cellular network 250 serves as the secondary network for bypassing the IP network 190 for data traffic. The call manager 150 continues to be coupled to the IP network 190 by signal line 226. In this embodiment, a call with low quality of service can be transitioned to either the PSTN network 180 or the cellular network 250. Furthermore, the call manager 150 can determine which of the secondary networks (PSTN 180 or cellular network 250) are available for the endpoints 202, 208, and then utilize the secondary network most effective to improve call quality for the endpoints 202, 208. The call manager 150 cooperates with the gateway 204 to establish, set up and switch over the calls from the IP network 190 to the PSTN 180 or the cellular network 250. In one embodiment, the present invention first uses the IP network 190, and if quality is below acceptable level transitions to the cellular network 250. If quality using the cellular network 250 is still below an acceptable level, the system transitions to the PSTN 180.

Figure 2F:
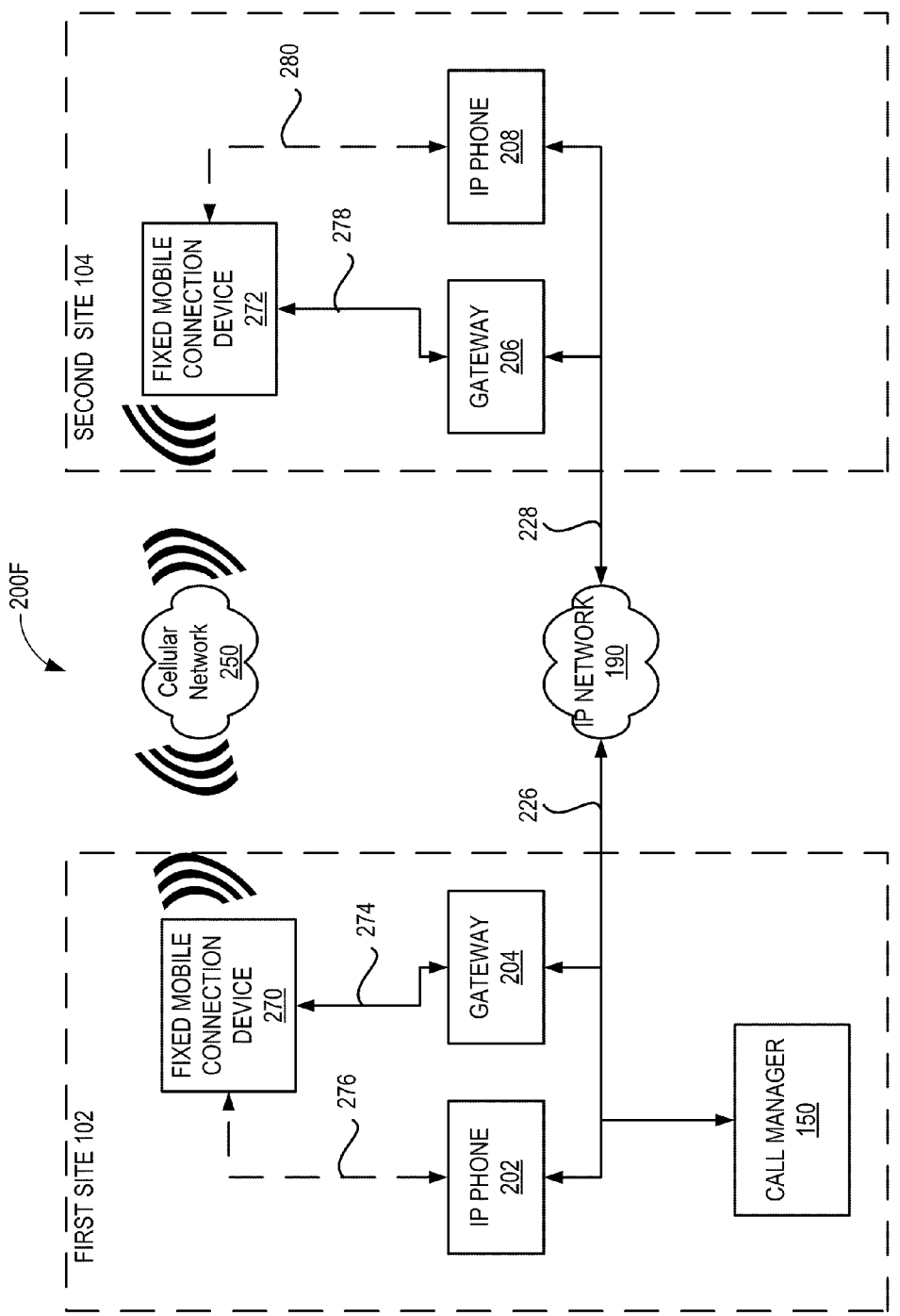

Referring now to FIG. 2F, a sixth embodiment of a system 200F having the first site 102 and the second site 104 will be described. This sixth embodiment of the system 200F includes similar components to the fourth embodiment of the system 200D described above so again that description will not be repeated here. Like reference numerals have been used for like components with similar functionality. However, the sixth embodiment of the system 200F depicts an example topology including the cellular network 250 and fixed mobile connection devices 270, 272 for coupling to the cellular network 250. In one embodiment, the fixed mobile connection devices 270, 272 are coupled by signal lines 274 and 278 to gateway 204 and 206, respectively. In an alternate embodiment, the fixed mobile connection devices 270, 272 are coupled by signal lines 276 and 280 (shown with dashed lines to reflect an alternate configuration) to the IP phones 202 and 208. For example, the fixed mobile connection devices 270, 272 are built into the IP phones 202 and 208. In this embodiment, the connection devices 270, 272 and signal lines 274 and 278 or signal lines 276 and 280 provide communication and control paths with similar functionality. The fixed mobile connection devices 270, 272 communicate with the cellular network 250 using radio wave in a conventional manner. In a modified embodiment of the system 200F, the fixed mobile connection device 270 is embedded in gateway 204 and the fixed mobile connection device 272 is embedded in gateway 206. Such a configuration is advantageous because no other systems need to know about the new media path except the gateways 204, 206. When such a modified embodiment of the system 200F is combined with the embodiment of system 200E in FIG. 2E, the gateways have the flexibility to use the PSTN 180 or the cellular network 250, or a combination— using the PSTN 180 unless it was at capacity or failed, then switching to cellular network 250—or vice versa. In a similar modification, the fixed mobile connection device 270 is embedded in the IP phone 202 and the fixed mobile connection device 272 is embedded in IP phone 208. Having the fixed mobile connection device 270, 272 embedded in the IP phone 202, 208 is advantageous because the IP telephony system 105 can be deploy without any dependence on any IP infrastructure whatsoever. This configuration sends voice over a wireless IP network 190 (the gateway 204 could be outside the premises and the call manager 150 in the cloud of the service provider, and thus no installer has to enter the premises. The customer receives the phones from an overnight common carrier such as FedEX and plugs them into a wall socket for AC power) or the cellular network 250. If the gateway 204 includes the fixed mobile connection device 270, then in the event the IP network 190 fails, the cellular data network 250 is used for the IP traffic.

Figure 2G:
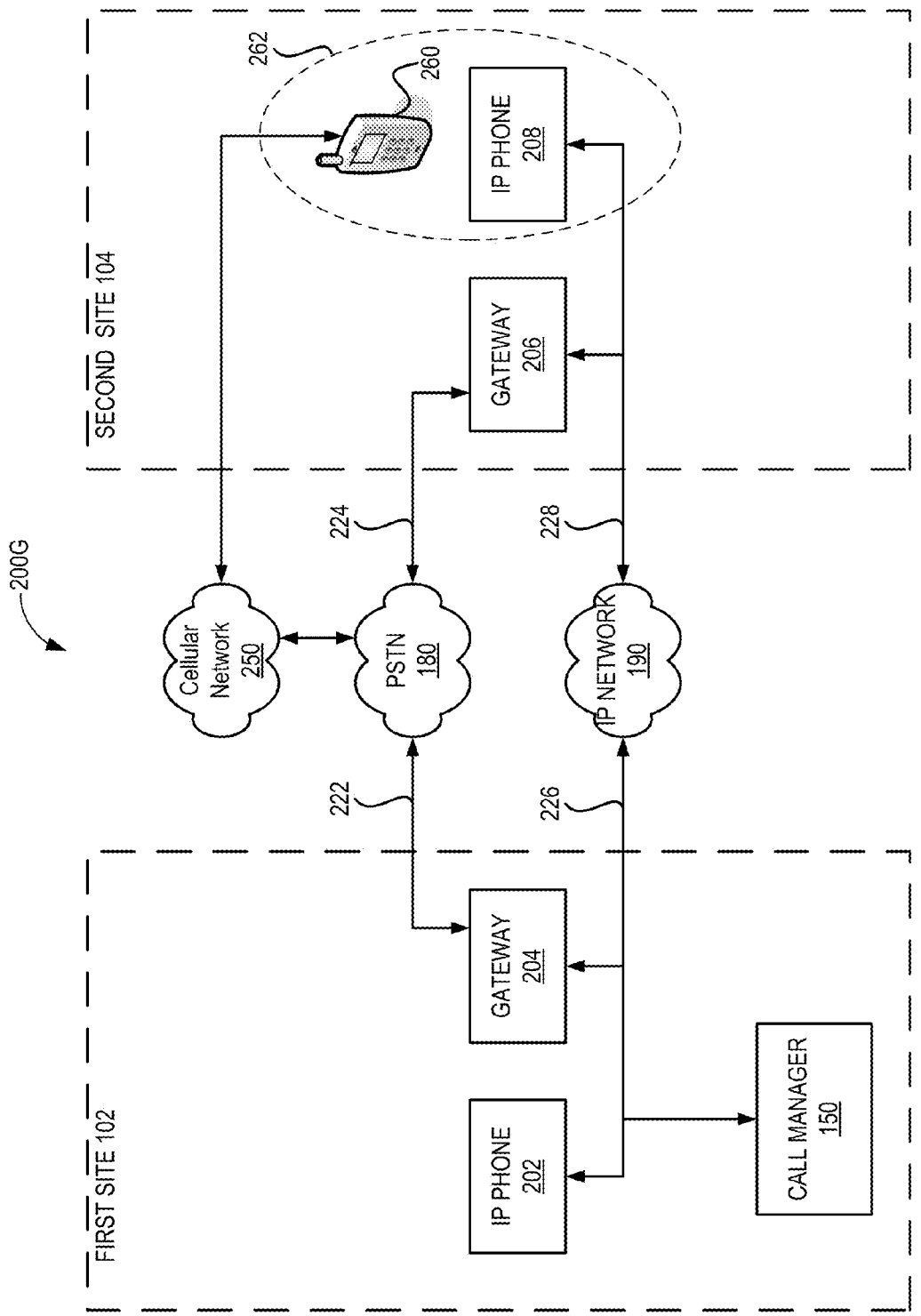

Referring now to FIG. 2G, a seventh embodiment of a system 200E having the first site 102 and the second site 104 will be described. This seventh embodiment of the system 200G includes similar components to the fourth embodiment of the system 200D described above so again that description will not be repeated here. Like reference numerals have been used for like components with similar functionality. However, the seventh embodiment of the system 200G depicts an example topology including both the PSTN 180 and the cellular network 250. This fifth embodiment of the system 200G also includes a mobile phone 260 that has been associated 262 with and IP phone 208. When a caller at site 102 has poor voice quality to IP phone 208, the call manager 150 simply calls the user of IP phone 208's mobile phone 260 (assuming there has been a prior association between IP phone 208 and a user, and the user's mobile phone). More specifically, the call is routed from the IP phone 202 to the gateway 204 to the PSTN 180, to the cellular network 250 and then to mobile phone 260. This way, the second site 104 needs no special equipment to provide a bypass path with improved call quality.

Figure 3:
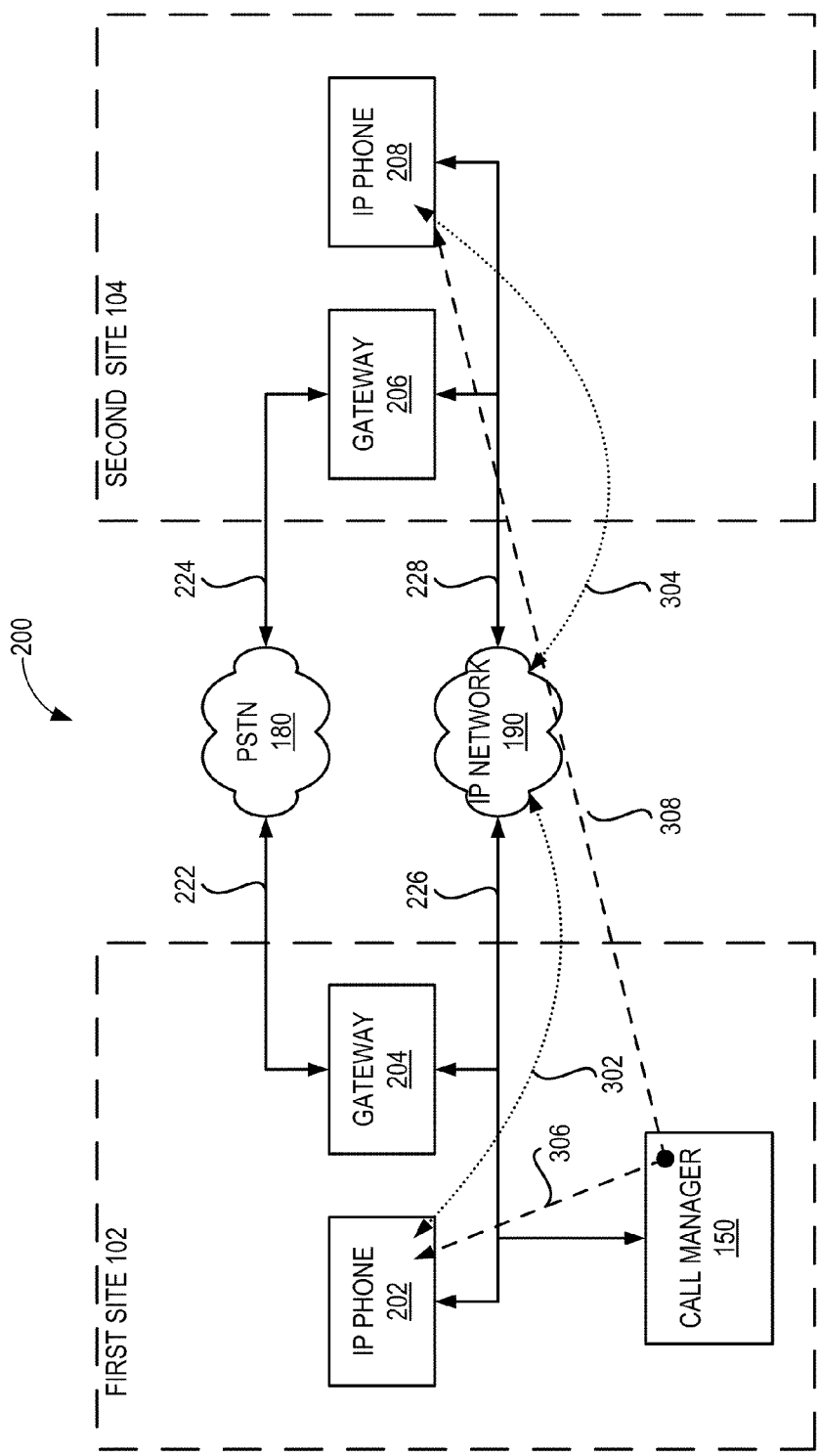
FIG. 3 is a block diagram illustrating the system of FIG. 2A showing a call using the IP network and for call control and data transmission according to one embodiment of the present invention.

Referring now to FIG. 3, initialization and establishment of a call within the IP telephony system 200A using the IP network 190 for both call control and data communication (or data connection or media transmission) is shown. FIG. 3 shows an IP call. The call is set up by call manager 150, and IP media (voice data) flows between the phones 202, 208 over the IP network 190 as indicated by dashed lines 302, 304. The IP network 190 is also used by the call manager 150 to send and receive call control signals to/from the IP phones 202, 208 as indicated by the dashed lines 306, 308, respectively.

There are occurrences when an IP call cannot be completed, or cannot provide acceptable voice quality to the user. The call may not be completed because there is a bandwidth limit on the IP network 190 and no more calls can be accepted. The IP network 190 may have congestion issues, causing packets to be lost or delayed, which makes the call difficult or impossible to understand. Under these conditions, the present invention advantageously places the call media on the PSTN 180 while retaining the IP network 190 for call control. Although the IP network 190 may not be performing well enough to carry voice, it performs well enough for call control, and thus present invention maintains the additional functionality provided by IP telephony. This is particularly advantageous because the present invention allows the continued use of Internet Protocol (IP) telephony call control features lacking in the PSTN trunks, giving it a functionality advantage.

Figure 4:
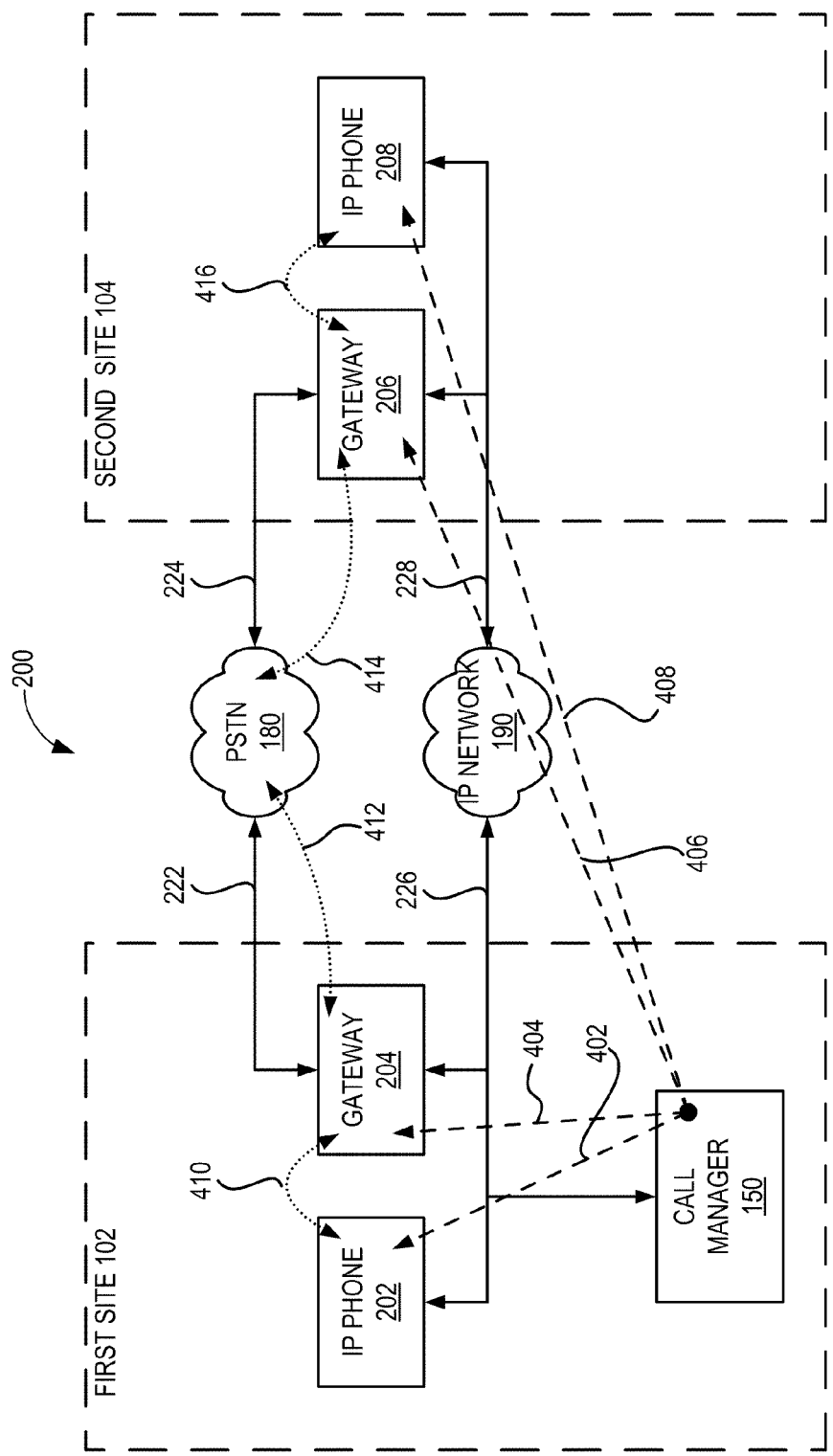
FIG. 4 is a block diagram illustrating the system of FIG. 2A showing a call using the IP network and for call control and the PSTN for data transmission according to one embodiment of the present invention.

Referring now also to FIG. 4, the modification of the call within the IP telephony system 200A to use the IP network 190 for call control and the PSTN 180 for data communication (or data connection or media transmission) is shown. FIG. 4 illustrates the case of IP PSTN fallback. Either at the initiation of the call or during the call, the call manager 150 detects that the IP network 190 is underperforming and places a PSTN call between two gateways 204, 206 that bypass the underperforming IP network 190. The originating gateway 204 uses PSTN signaling 412 to the answering gateway 206 (received as signal 414) to identify the IP call to allow the gateway 206 to convert the PSTN call to IP media packets and transmit the media packets to the receiving endpoint 208, and packets transmitted from this endpoint 208 are sent to the gateway 206, which transmits the media in the opposite direction to the originating gateway 204, which then forwards media packets to the originating endpoint 202. The IP network 190 is retained for call control, but the PSTN 180 is used for media transmission. Should the IP network 190 become capable of passing voice acceptably, the media path can be transferred back to the IP network 190 and the PSTN call can be dropped (See FIG. 12 below).

Figure 5:
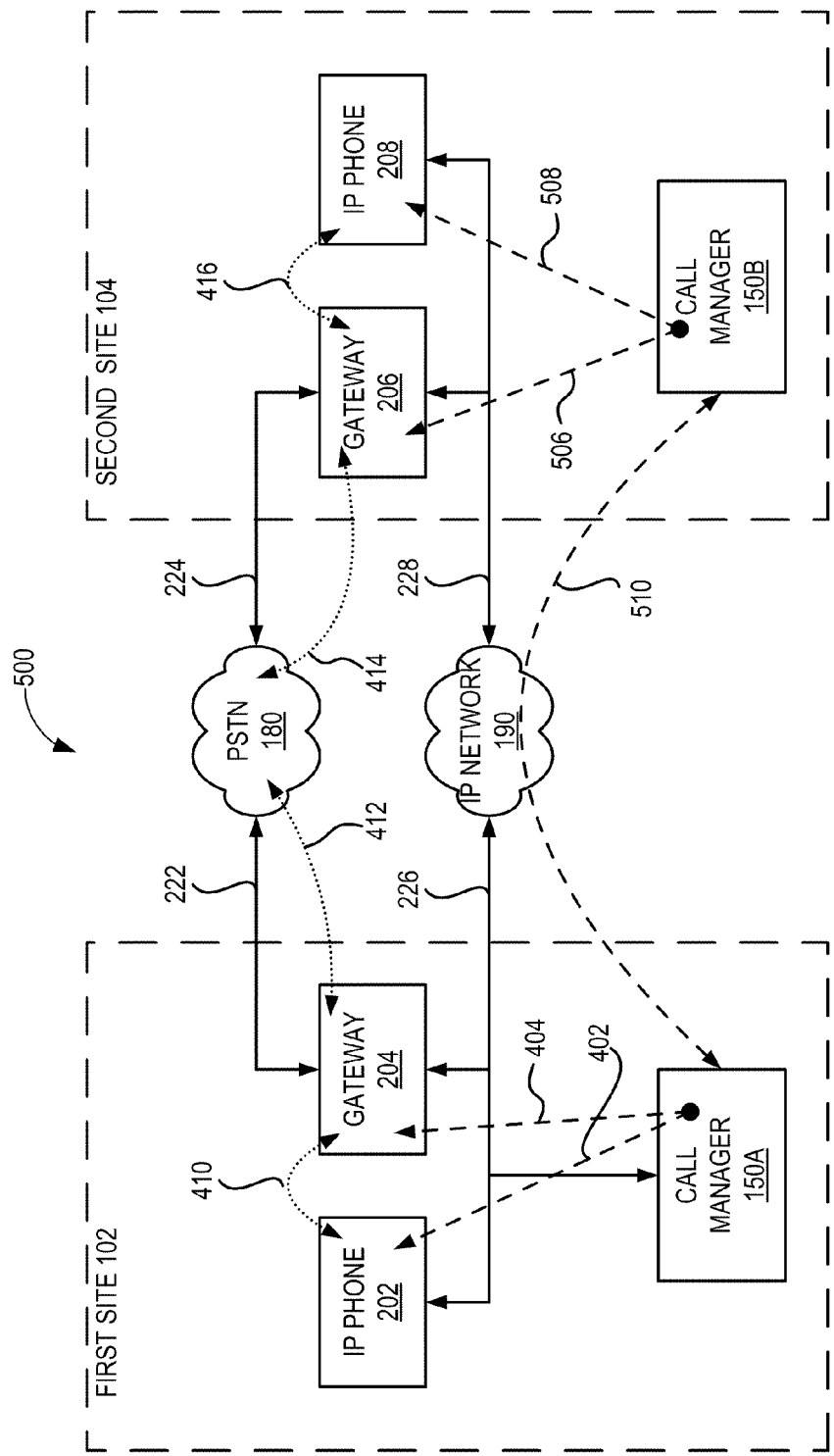
FIG. 5 is a block diagram illustrating a system having a first site and a second site each having a call manager according to one embodiment of the present invention.

The call is switched from the status shown in FIG. 3 to that of FIG. 4. The call manager 150 already has control of the IP phone 202 and the gateway 204 of the first site 102 as indicated by the dashed lines 402, 404 respectively. The call manager 150 also already has control of the IP phone 208 and the gateway 206 of the second site 104 as indicated by the dashed lines 408, 406, respectively. This enables the call manager 150 to control the gateways 204, 206 to set up a call between them on the PSTN 180. Next, the gateway 204 of the first site 102 calls the second site 104 gateway 206. When second site 104 gateway 206 answers the phone, it needs to know that this call is from gateway 204 and not just any call from elsewhere in the PSTN 180 to this number. The call manager 150 informs the gateway 206 of the incoming call and passes it an identifier (using 222/224) to disambiguate the call from other PSTN calls. The call manager 150 instructs gateway 204 to transmit the identifier using the PSTN 180. The solution is to signal on the PSTN 180 that this is a bypass call. There are multiple types of PSTN connections, and the signaling is different on each. If the PSTN connection is an analog phone line, then the signaling must be done in-band by inserting a tone or tones. This can be done in a manner similar to how FAX machines work. A simple way of signaling on an analog line that the call is for the first site 102 gateway 204 is to play one of the 4 special DTMF tones that can't be typed from a key pad—known as A, B, C or D when gateway 206 answers the phone, and gateway 206 acknowledges with one of the A, B, C or D tones. These tones cannot be generated by a normal telephone key pad, and are extremely unlikely to be generated by human voice or other audio. By increasing the exchange to several tones, the possibility of some other form of audio being present in the call can be eliminated. Once the call on the PSTN 180 is established, the call manager 150 directs the IP phones 202, 208 and the gateways 204, 206 to send the IP media (voice data) over the PSTN 180 as shown by dashed lines 410, 412, 414 and 416. The IP network 190 is also used by the call manager 150 to send and receive call control signals to/from the IP phones 202, 208 as indicated by the dashed lines 402, 408 respectively; and to the gateways 204, 206 as indicated by the dashed lines 404, 406 respectively Referring now to FIG. 5, another configuration of the system 500 of the present invention is shown. FIG. 5 illustrates an embodiment in which both the first site 102 includes a first call manager 150A and the second site 104 includes a second call manager 150B. As can be seen, the first call manager 150A of the first site 102 operates as has been described above to control IP phone 202 and gateway 204. The control between the call manager 150A, the IP phone 202 and gateway 204 are indicated by the dashed lines 402, 404, respectively. However, the second call manager 150B is included in the second site 104. The second call manager 150B assumes part of the responsibility formerly undertaken by the first call manager 150A. The second call manager 150B controls the operation of the gateway 106 and the IP phone 208 of the second site 104. The control between the call manager 150B, the IP phone 208 and gateway 206 are indicated by the dashed lines 508, 506, respectively. The second call manager 150B is also coupled for communication with the first call manager 150 as indicated by dashed line 510 to coordinate their actions. In the embodiment shown, the first call manager 150A and the second call manager 150B are coupled for communication by IP network 190, signal line 226 and signal line 228. Those skilled in the art will recognize that a variety of other means that allow the first call manager 150A to communicate with the second call manager 150B may alternatively be used. Collectively, the first call manager 150A and the second call manager 150B perform the functions as had been described above for the call manager 150 of FIG. 4.

Figure 6A:
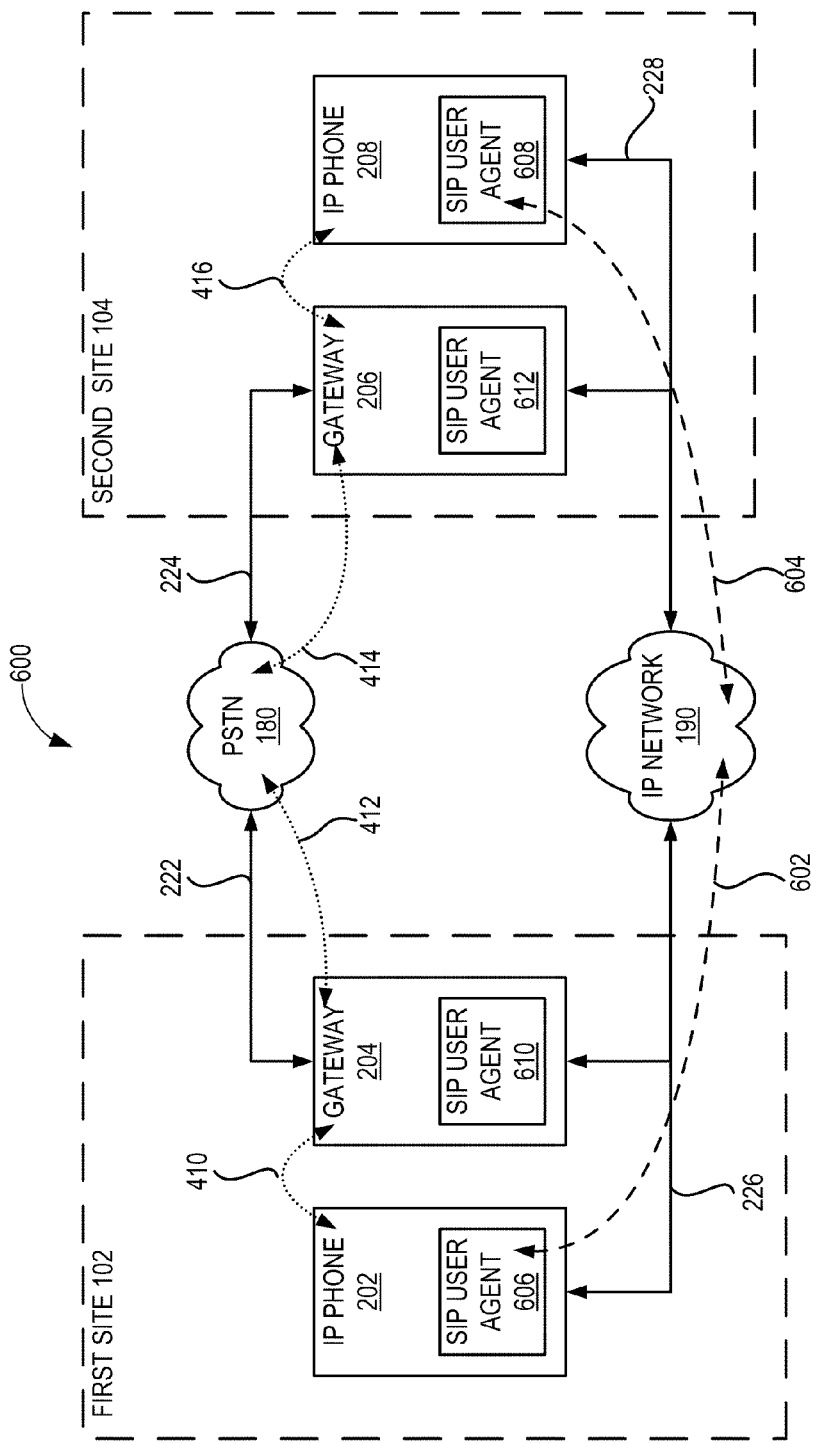
FIGS. 6A and 6B are block diagrams illustrating a system having a first site and a second site using peer-to-peer communication for call control and a PSTN for data transmission according to embodiments of the present invention.

Referring now to FIG. 6A, one embodiment of a system 600 implementing the present invention using peer-to-peer communication is shown. In this embodiment, a Session Initiation Protocol (SIP) user agent 606, 608 is incorporated into each IP phone 202, 208. A SIP user agent 610, 612 is also included the first and second gateway 204, 206. The SIP user agents 606, 608, 610 and 612 help route requests to the user's current location, authenticate and authorize users for services, and implement provider call-routing policies. The SIP user agents 606, 608, 610 and 612 communicate with each other using signal lines 226, 228 that represent the Local Area Network (LAN) of the first site 102 and the second site 104, respectively, and the IP network 190 that represents a Wide Area Network (WAN) 190. The SIP user agents 606, 608, 610 and 612 include functionality has been described above with reference to the call manager 150 for implementing the IP PSTN fall back functionality of the present invention.

Initially, the SIP user agents 606, 608, 610 and 612 establish the call over the LAN 226 of the first site, the IP network 190, and the LAN of the second site 228. In one embodiment, the call set up and management is done with the SIP user agent 606 of the IP phone 202 using the LAN 226, the IP network 190 and the LAN 228 to communicate with the SIP agent 608 of the IP phone 208 to establish a call using the IP network 190 for the media as indicated by dashed lines 602, 604. Once the call has been established with a media stream passing over the IP Network 190 between IP phone 202 and IP phone 208, the SIP user agent 606 of the IP phone 202 monitors for and detects poor network performance. For example, the SIP user agent 606 can do this by observing statistics on its own calls. If the SIP user agent 606 of the IP phone 202 detects poor quality, it contacts the SIP user agent 610 of the gateway 204 using the LAN 226. The SIP user agent 606 of the IP phone 202 tells the SIP user agent 610 of the gateway 204 to place a PSTN bypass call to gateway 206 and to signal on the PSTN to disambiguate from other calls. The SIP user agent 610 uses SIP to inform the SIP user agent 612 of gateway 206 about the PSTN bypass call and also passes along the disambiguation identifier. On completion of the call, the SIP user agent 612 of the gateway 206 provides a media path identifier to the SIP user agent 606 of IP phone 202. The SIP user agent 606 of IP phone 202 then contacts SIP user agent 608 of IP phone 208 with a SIP re-invite message to change the call's media path from the current one to one using the media identifier provided by SIP user agent 612 of gateway 206. The media then is removed from the IP network 190, and PSTN 180 bypass occurs, media flowing from IP phone 202 over 410 the first site 102 LAN 226 to the gateway 204, over 412,414 the PSTN to gateway 206, then over 416 the second site 104 LAN to phone 208. This configuration allows call control communication between the IP phone 202 of the first site 102 and IP phone 208 of the second site 104 to be undertaken with a peer-to-peer form of communication. One advantage of this configuration is that it obviates the need to have a separate call manager managing all the calls from a given site 102, 104. The communication for call control between the IP phone 202, the IP phone 208, the first gateway 204 and the second gateway 206 is performed by appropriate SIP user agents 606, 608, 610 and 612. The system 600 transitions from media/data communication path similar to that shown in FIG. 3 over the LAN 226, IP network 190 and LAN 228 to the PSTN fallback communication path shown in FIG. 6A over the LAN 226, PSTN 180 and LAN 228. By virtue of the peer-to-peer communication, all the advantages of IP telephony in terms of advanced call features can be maintained.

Figure 6B:
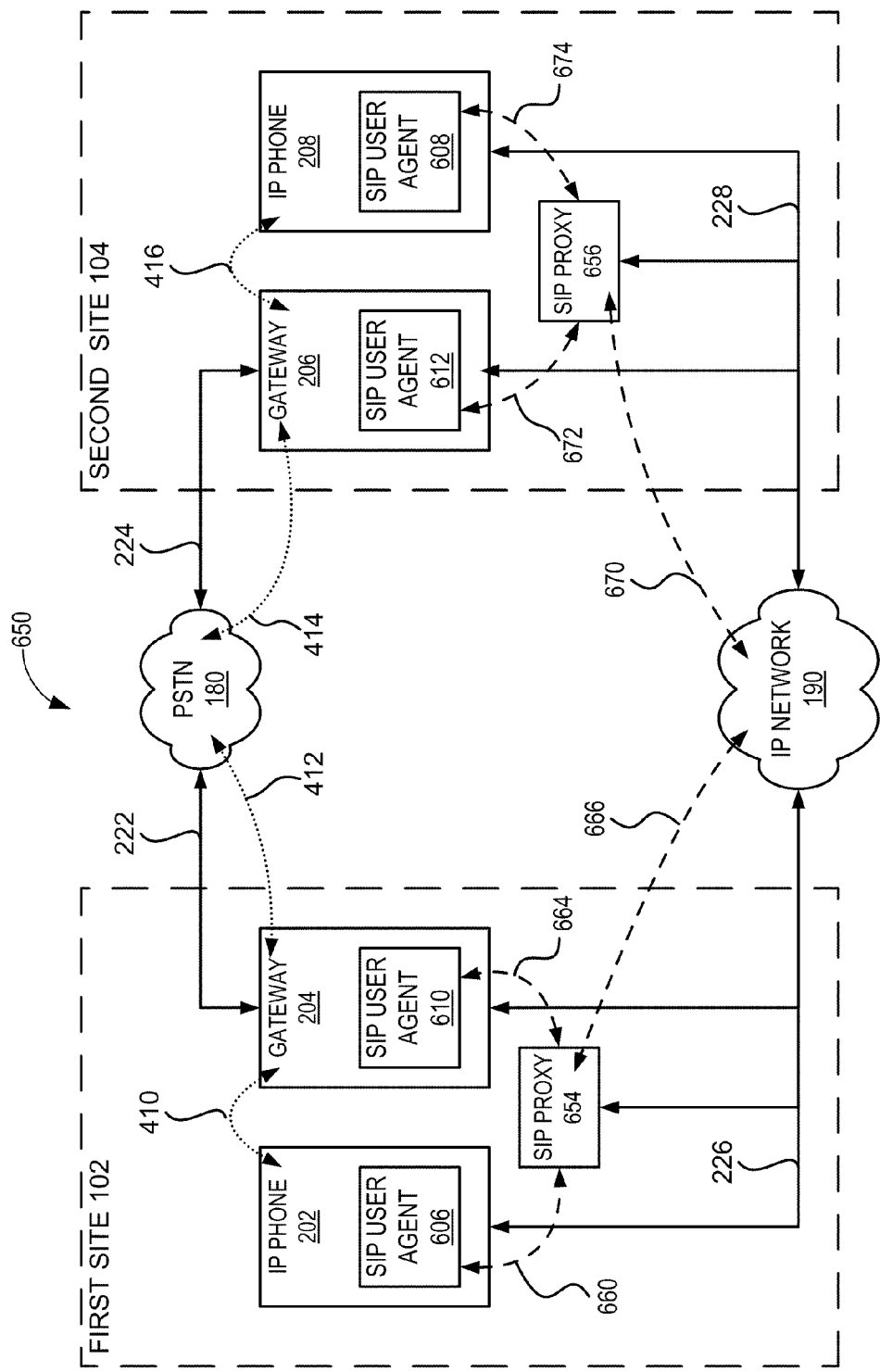

Referring now to FIG. 6B, another embodiment of a system 650 implementing the present invention using peer-to-peer communication is shown. The configuration of the FIG. 6B is similar to FIG. 6A in that SIP user agents 606, 608, 610 and 612 are incorporated into the IP phones 202, 208 and the first and second gateway 204, 206, respectively. The system 650 also includes a SIP proxy 654, 656 at each site 102, 104. The SIP user agents 606, 608, 610 and 612 and the SIP proxies 654, 656 communicate with each other as necessary using LANs 226, 228 and the IP network 190. The SIP user agents 606, 608, 610 and 612 and the SIP proxies 654, 656 implement the IP PSTN fall back functionality of the present invention. The control communication between the IP phone 202, the IP phone 208, the first gateway 204 and the second gateway 206 is performed by appropriate SIP user agents 606, 608, 610 and 612 and the SIP proxies 654, 656. For example, FIG. 6B illustrates how SIP user agent 606 and SIP user agent 610 communicate with SIP proxy 654 via LAN 226 as shown by dashed lines 660 and 664, respectively. The SIP user agent 606 and SIP user agent 610 can also communicate with each other through SIP proxy 654. The SIP proxy 654 communicates with SIP proxy 656 as shown by dashed lines 666 and 670. At the second site 104, the SIP user agent 612 and the SIP user agent 608 communicate with SIP proxy 656 as shown by dashed lines 672 and 674, respectively. The primary different between FIGS. 6A and 6B is that the SIP proxies 654, 656 handle the call control communication between the SIP user agents 606, 608, 610 and 612. Those skilled the art will recognize how the same call control to switched between a media path over the LAN 226, IP network 190 and LAN 228 to a media path over the LAN 226, PSTN 180 and LAN 228, or vice versa, can be implanted using the configuration of FIG. 6B, with the call control signals additionally being routed between SIP agents using 606, 608, 610 and 612 the SIP proxies 654, 656.

Figure 7:
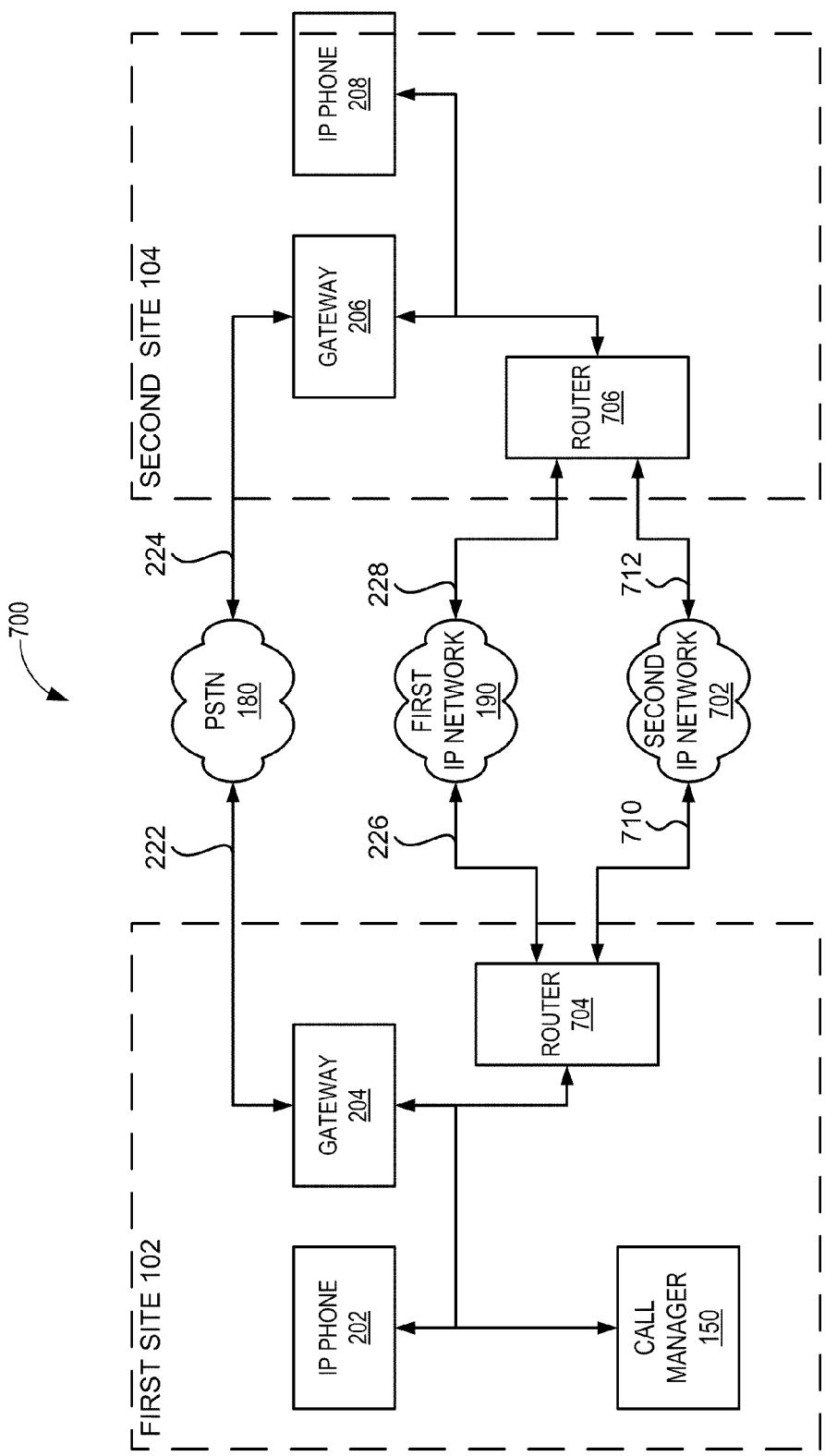
FIG. 7 is a block diagram illustrating a system having a first site and a second site coupled by a first IP network, a second IP network and a PSTN according to one embodiment of the present invention.

Referring now to FIG. 7, yet another embodiment for a system 700 in accordance with the present invention is shown. The system 700 of FIG. 7 is similar to that described above with reference to FIG. 2, but also includes a second IP network 702, and routers 704 and 706 are added to enable the first and second sites 102 and 104 to access both the first and the second IP networks 190, 702. When the call manager 150 determines to use the second IP network 702, it instructs the gateway 204 to mark the packets with a different priority. A common practice is DiffServ, which is used for quality of service settings in a network. The routers 704 and 706 are configured to send normal packets and normal media packets using the first IP network 190 and routes packets with a different priority to the second IP network 702. It should be obvious to one skilled in the arts that there may be other signaling techniques to indicate to a router which network path should be utilized. The system 700 illustrates how the present invention is used to improve quality of service by providing fallback for other types of networks such as the second IP network 702 in addition to or in contrast to the PSTN 180. This provides an additional level of reliability for both the data communication as well as the control communication. For example, for the system 700, the call manager 150 can be set to first fall back to the second IP network 702, and then to fall back to the PSTN 180.

Call Manager 150

Figure 8:
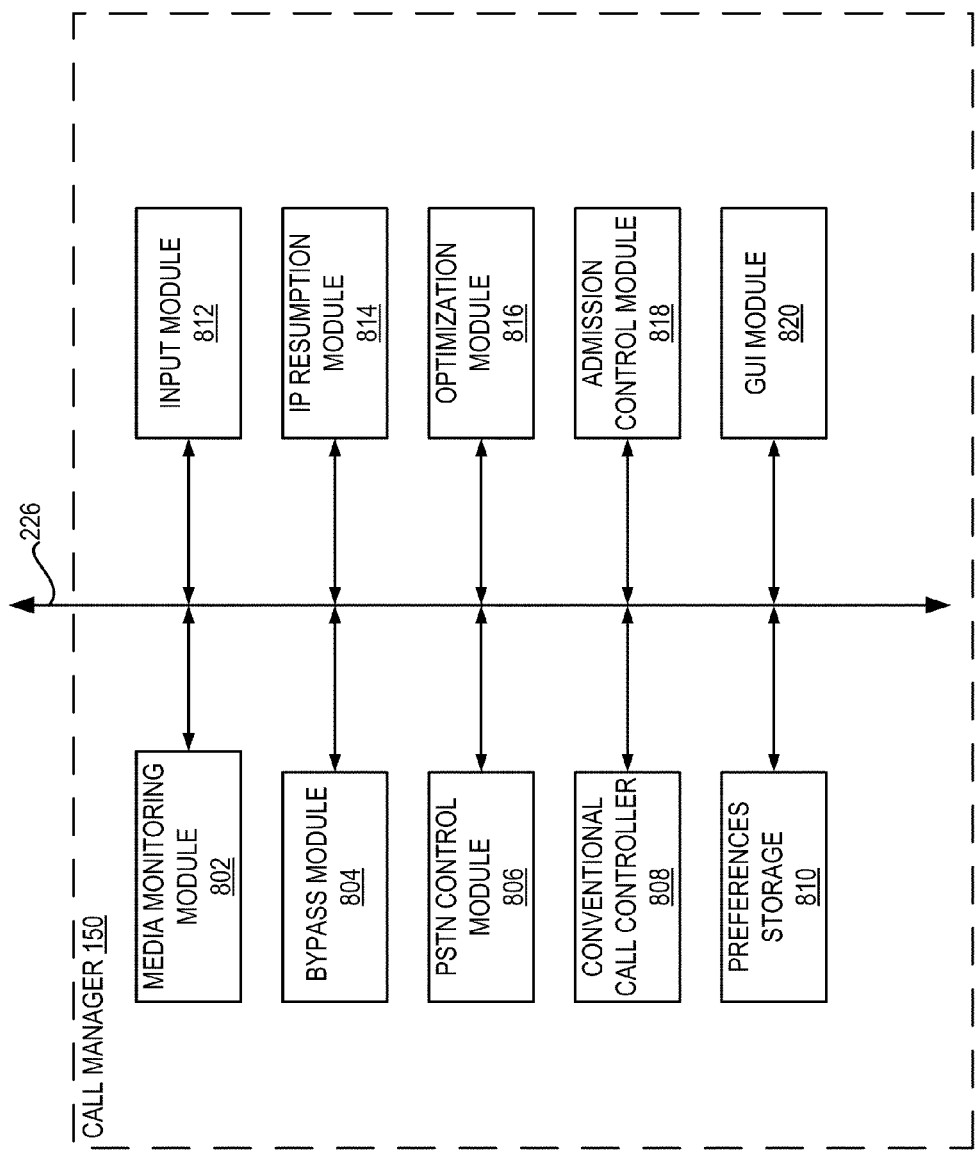
FIG. 8 is a block diagram illustrating a call manager according to one embodiment of the present invention.

Referring now to FIG. 8, one embodiment for the call manager 150 is shown. The call manager 150 comprises a media monitoring module 802, a bypass module 804, a PSTN control module 806, a conventional call controller module 808, a storage 810 for preferences, an input module 812, an IP resumption module 814 and an optimization module 816. In one embodiment, the media monitoring module 802, the bypass module 804, the PSTN control module 806, the conventional call controller module 808, the storage 810 for preferences, the input module 812, the IP resumption module 814, the optimization module 816, the admission control module 818 and the graphic user interface (GUI) module 820 are coupled to signal line 226 for communication with the other modules. These modules 802-820 will be described below briefly but are also described below in detail with reference to FIGS. 11-13. Those skilled in the art will recognize that while the modules 802-820 are described below as software or routines that are executable by a processor of a computer, in other embodiments, the modules 802-820 may be dedicated hardware circuitry or logic or a combination of specialized hardware and software.

The media monitoring module 802 is software and routines for determining the quality of service on the primary network. The media monitoring module 802 determines when there is sufficient network quality by looking at media statistics, particularly percentages of lost packets, and delayed packets on the IP network 190 for the call. The media monitoring module 802 also determines whether the IP network 190 is available at all. In one embodiment, in the media monitoring module 802 maintains a threshold for quality of service, and as long as the IP network 190 can maintain quality of service above that threshold then the media monitoring module 802 signals that fallback is not necessary. In another embodiment where the configuration includes two IP networks with 190, 702, the media monitoring module 802 also determines whether the second IP network 702 has sufficient quality of service for the call. The media monitoring module 802 signals the condition of the IP network 190 to the bypass module 804 and the conventional call controller 808. Those skilled in the art will understand that the media monitoring module 802 signals not only the transition in state from the IP network 190 being available with sufficient quality to available but insufficient quality to unavailable, but also the transition in state from the IP network 190 being unavailable to available.

The admission control module 818 is software and routines for determining the available bandwidth on the IP network 190, which may be the primary network, second network or other network. The admission control module 818 determines when there is sufficient bandwidth by looking at maximum permitted network utilization from preferences storage 810, and computing the amount of bandwidth consumed by current media. The admission control module 818 signals the available bandwidth of the IP network 190 to the bypass module 804 (if bypass to another IP network may be performed), conventional call controller 808 and IP resumption module 814.

The bypass module 804 is software and routines for switching the media transmission portion of the data communication from being on the IP network 190 to being on the PSTN 180. In embodiments that include the IP resumption module 814, the bypass module 804 also controls the switching of media transmission from being on the PSTN 180 for being on the IP network 190. The bypass module 804 sends and receives signals from the media monitoring module 802 for the current state of the IP network 190 and whether a fallback is necessary. The bypass module 804 communicates with the conventional call controller 808 to establish a call over the IP network 190. The bypass module 804 also signals the conventional call controller 808 to implement the advanced features offered in IP telephony systems. The bypass module 804 also communicates with the PSTN control module 806 to begin a call over the PSTN 180. The bypass module 804 is also coupled to communicate with the preferences storage 810 and receives user input via the input module 812. Basically, the bypass module 804 controls the operation of the present invention to implement fallback from the IP network 190 to the PSTN 180.

The PSTN control module 806 is software and routines for establishing a call over the PSTN 180. The PSTN control module 806 is adapted for communication with the bypass module 804, the IP resumption module 814 and gateways 204, 206. The PSTN control module 806 is responsible for managing (establishing and terminating) the call on the PSTN 180 between the IP phones 202, 208 and the gateways 204, 206. The PSTN control module 806 sends signals to the gateways 204, 206 to initiate a call on the PSTN 180, insert identifying signaling as part of the call set up and establish the calls so that the media transmission can be switched from the IP network 190.

The conventional call controller module 808 is software and routines for call control functionality as has been described above. For example, the conventional call control module 808 provides the advanced features IP telephony system such as but not limited to graphical user interface, directory, intercom, conference calling, pickup group, hunt group, etc. Those skilled in the art will recognize that as additional call control functionality is implemented, the present invention may be continued to be used with call controllers having additional functionality.

The storage 810 is used for storing preferences from the administrator, the user or both. In one embodiment, the bypass module 804 may have different conditions under which the PSTN fall back is initiated. The administrator can store preferences and storage 810 as to when and under what conditions the PSTN fall back should be used. For example, a preference could be set such that for all conference calls the PSTN 180 is used for the media transmission. Similarly, the user may store a smaller number of preferences such as a preference to have particular calls using the PSTN 180. In such a case, the bypass module 804 may prompt the user before switching to the PSTN 180. An additional example is for particular users that should be guaranteed a high quality of service, and if the IP network 190 is judged to have some chance of failing to provide quality of service, then this user's media will be placed on the PSTN 180. The storage 810 is adapted for communication with the bypass module 804 and the IP resumption module 814.

The input module 812 is software and routines for processing input from the user. The input module 812 receives signals from the IP phones 202, 208 and sends them to be bypass module 804 and/or the IP resumption module 814 for further processing. In one embodiment, the present invention request input from the user before switching between the IP network 190 and a PSTN 180 and vice versa. The input module 812 is responsible for receiving signals and sending them to the appropriate module.

The IP resumption module 814 is software and routines for switching of data communication from being on the PSTN 180 to being on the IP network 190. The IP resumption module 814 sends and receives signals from the media monitoring module 802 and admission control module 818 for the current state of the IP network 190 and whether media transmission can be switched back from the PSTN 180 to the IP network 190. The IP resumption module 814 communicates with the conventional call controller 808 to establish a call over the IP network 190. The IP resumption module 814 also signals the conventional call controller 808 to implement the advanced features offered in IP telephony systems. The IP resumption module also communicates with the PSTN control module 806 to end the call over the PSTN 180. The IP resumption module is also coupled to communicate with the preferences storage 810 and receives user input via the input module 812.

The optimization module 816 is software routines for managing the switching between the IP network 190 and the PSTN 180, and vice versa. In one embodiment, the optimization module 816 controls the bypass module 804 and the IP resumption module 814 such that switching occurs adaptively to ensure a predetermined quality of service by using variable amounts of the PSTN 180. The optimization module 816 can optimize the switching based on a number of different parameters such as quality of service, cost, minimum switching, etc. For example, the optimization module 816 may be used to ensure that there is at least a predefined quality of service such that the system 200A may intermittently fall back to using the PSTN 180 to ensure that level of quality. Similarly, the optimization module 816 may be used to ensure that the cost is minimized. Since the cost of using the IP network 190 is significantly less than using the PSTN 180 for communication between IP phones 202, 208, in this instance the optimization module 816 minimizes the occurrences when the system 200A switches to using the PSTN 180. Thus, the optimization module 816 might permit some call quality degradation to minimize the cost. The optimization module 816 is adapted for communication with the bypass module 804 and the IP resumption module 814.

The graphic user interface (GUI) module 820 is software and routines that interact with the bypass module 804 and the media monitoring module 802 to present a graphic user interface to the user. More specifically, the graphical user interface module 820 receives a signal from the media monitoring module 802 indicating that the media quality has deteriorated beyond a predefined level. In one embodiment, the user provides input settings that specify the predefined level. In response to the signals from the media monitoring module 802, the graphic user interface module 820 generates a user interface and causes it to be displayed on the IP phone or personal call manager (PCM) being used by the user. In one embodiment, the user interface is generated by the call manager 150 and sent to the IP phone 202/208 for display. Once the interface is displayed for view by the user, the user inputs: 1) a selection to transition to secondary network for better quality; 2) a selection to stay with the current network despite the degradation in call quality; or 3) no selection is input and a timeout occurs. In response to signals received from the user via the IP phone 202/208 or timeout condition, the graphic user interface module 820 generates a control signal that is sent to the bypass module 804 specify the action to be taken. If the user has selected a transition to secondary network, the graphic user interface module 820 sends a signal to the bypass module 804 to transition to the secondary network. If the user has selected to remain on the current network or a timeout condition has occurred, the graphic user interface module 820 sends a signal to the bypass module 804 indicating that it should remain on the current network. In one embodiment, the GUI module 820 is integrated with interfaces for other features such as call control or providing information about call details. Example interfaces are shown and described below with reference to FIGS. 14-16.

Figure 9:
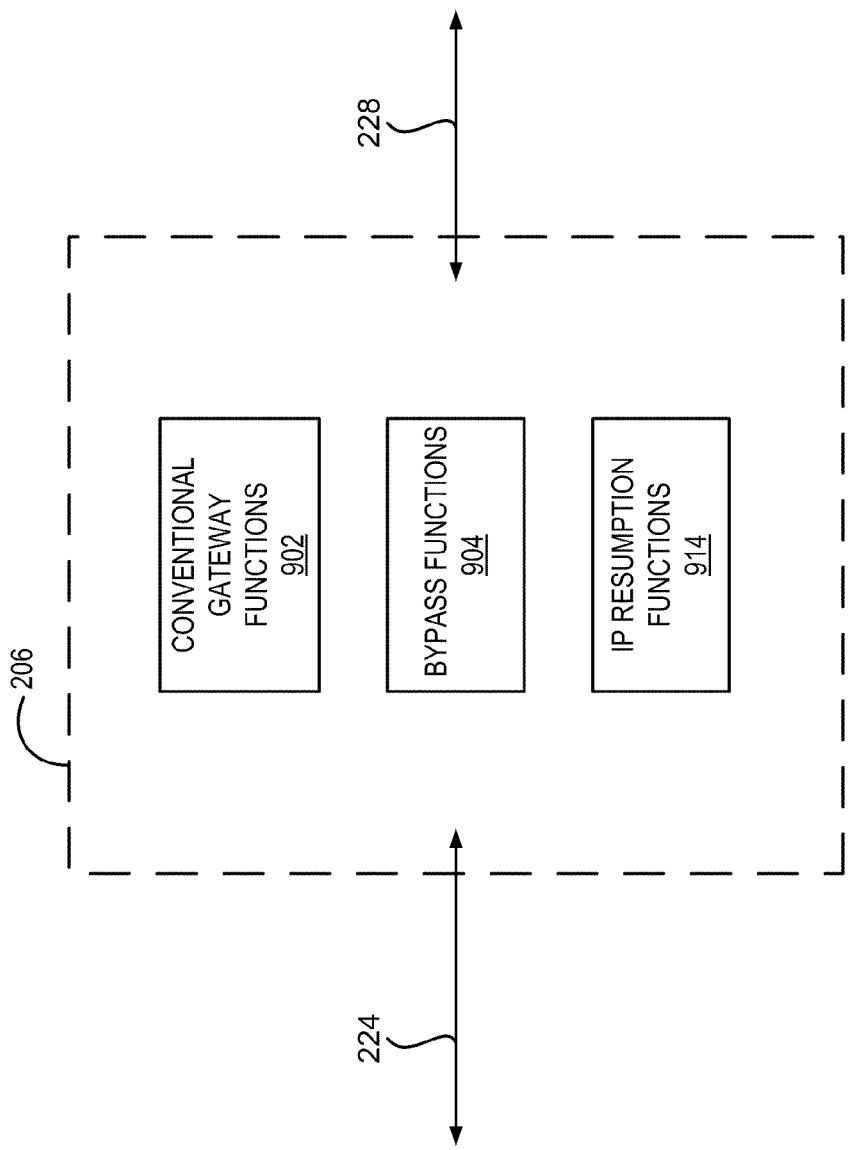
FIG. 9 is a block diagram illustrating a gateway according to one embodiment of the present invention.

Referring now to FIG. 9, an embodiment of the gateway 206 is shown. In accordance with the present invention, the gateway 206 includes conventional gateway functions 902, bypass functions 904 and IP resumption functions 914. The gateway 206 includes the conventional gateway functions 902 as will be understood by those skilled in the art. In addition, the present invention adds bypass functions 904 and IP resumption functions 914 to gateway. In one embodiment, the bypass functions 904 and the IP is resumption functions 914 are software or routines operational on the gateway 206. Those skilled in the art will recognize that these functions are modules or units. The bypass functions 904 include the operations described throughout this application for the gateway 206 to initiate and identify a call on the PSTN 180 as being associated with a particular IP phone. This includes both the initiation of the call at the sender's gateway by inserting or signaling call identification information as well as acceptance of the call at the receiver's gateway. This also includes association of a PSTN call with particular IP endpoints at both the sending gateway and receiving gateway. Furthermore, the bypass functions 904 include the control and operation of the reverse path of data from the receiver's gateway to the sender's gateway. Similarly, IP resumption functions 914 operate and control of the sender's and receiver's gateways to end the call over the PSTN 180.

Figure 10:
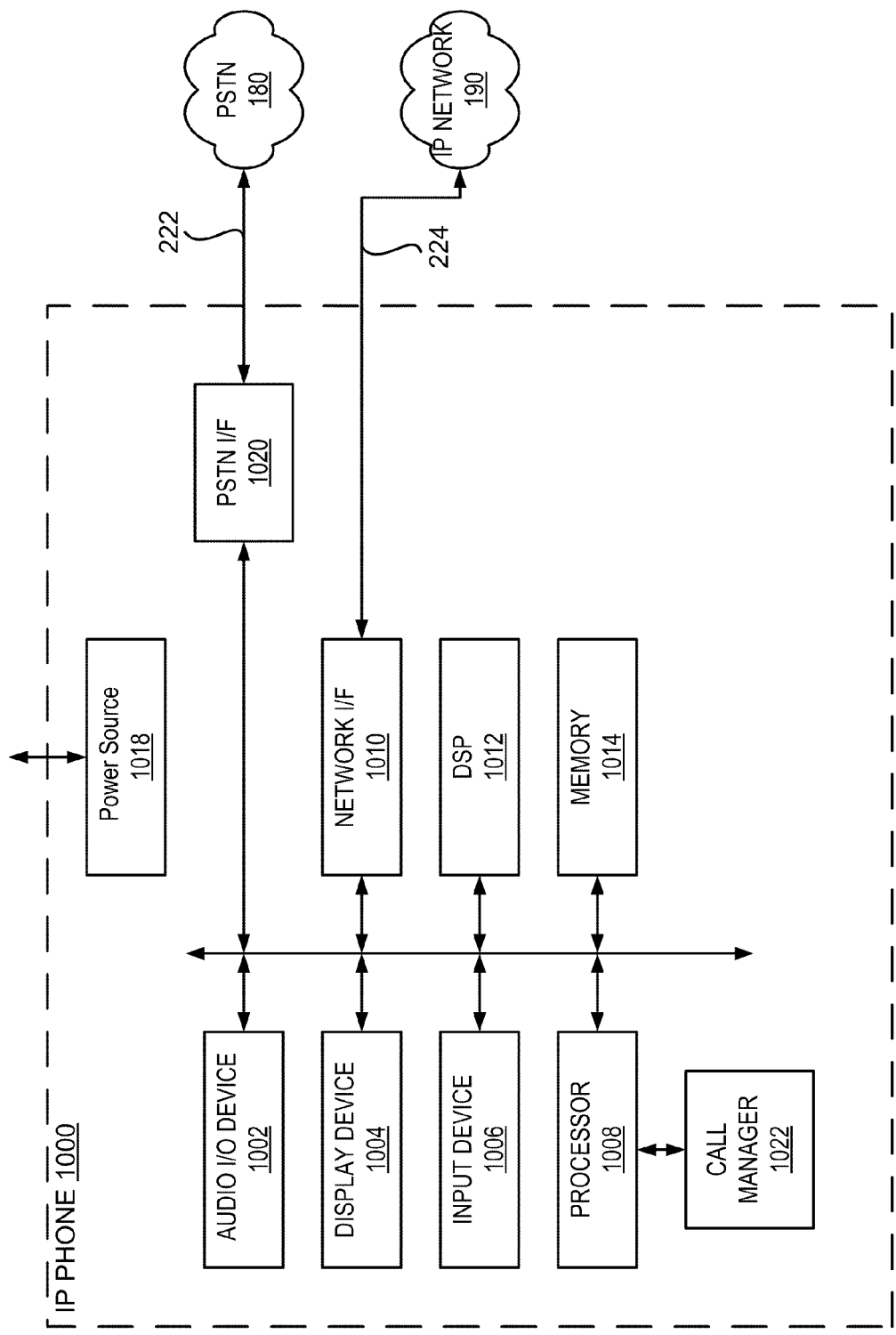
FIG. 10 is a block diagram illustrating an IP phone according to one embodiment of the present invention.

Referring now to FIG. 10, yet another embodiment of the present invention is shown. FIG. 10 illustrates an embodiment of the present invention integrated into an IP phone 1000. This embodiment of the IP phone 1000 includes conventional functionality for an IP phone including an audio input and output device 1002 such as one or more microphones and speakers, one or more display device 1004, an input device 1006, a processor 1008, a network interface 1010 such as an Ethernet connector, a digital signal processor (DSP) 1012, a memory 1014, and a power source 1018. The power source may be separate or coupled through the PSTN physical connection 222 or the IP network physical connection 224. These components cooperate in the conventional manner such as any of various examples included in IP phones commercially available. However, the present invention also includes a PSTN interface 1020 and a call manager 1022 in the IP phone 1000. The PSTN interface 1020 is coupled by signal line 222 to the PSTN 180. The network interface 1010 is coupled by signal line 224 to the IP network 190. The call controller 1022 is software on the processor 1008, coupled to the PSTN interface 1020 and PSTN 180, the IP network 190 and the network interface 1010. The network interface 1010 couples the other components of the IP phone 1000 to signal line 224 for communication over the IP network 109. The call manager is similar in functionality and operation to the call manager 150 described above. This embodiment of the present invention is particular the advantageous because it allows a single user remotely connected by an IP network 190 and a PSTN 180 to a site 102 to have the PSTN fall back functionality of the present invention. The IP phone 1000 need only be connected to the IP network 190 and the PSTN 180 as shown in FIG. 10 and the user has all the advantages of the present invention.

Methods

Figure 11:
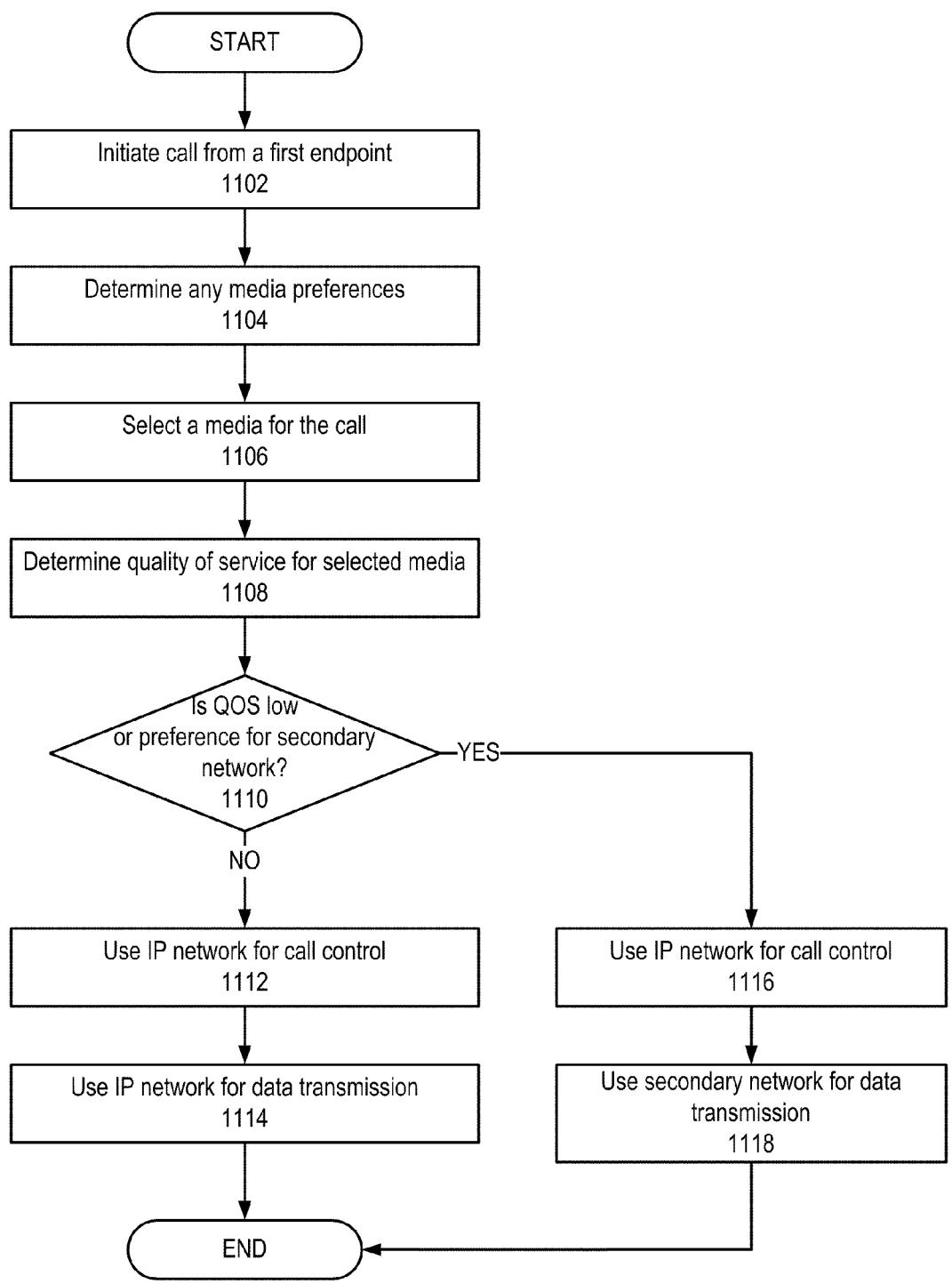
FIG. 11 is a flowchart illustrating a method for falling back to a secondary network to ensure call quality according to one embodiment of the present invention.
Figure 12:
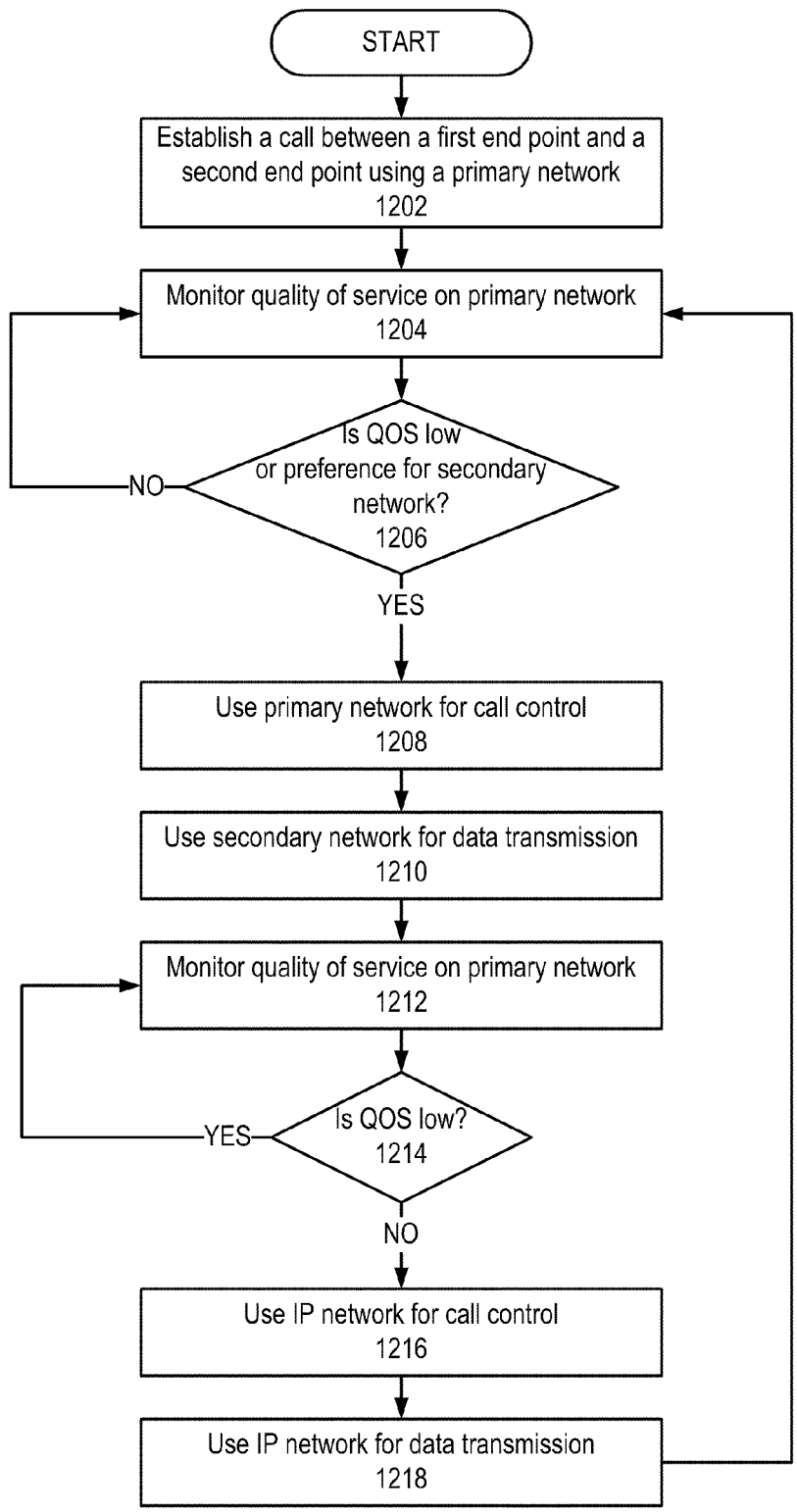
FIG. 12 is a flowchart illustrating a method for dynamically switching between a primary and a secondary network to ensure call quality according to one embodiment of the present invention.
Figure 13:
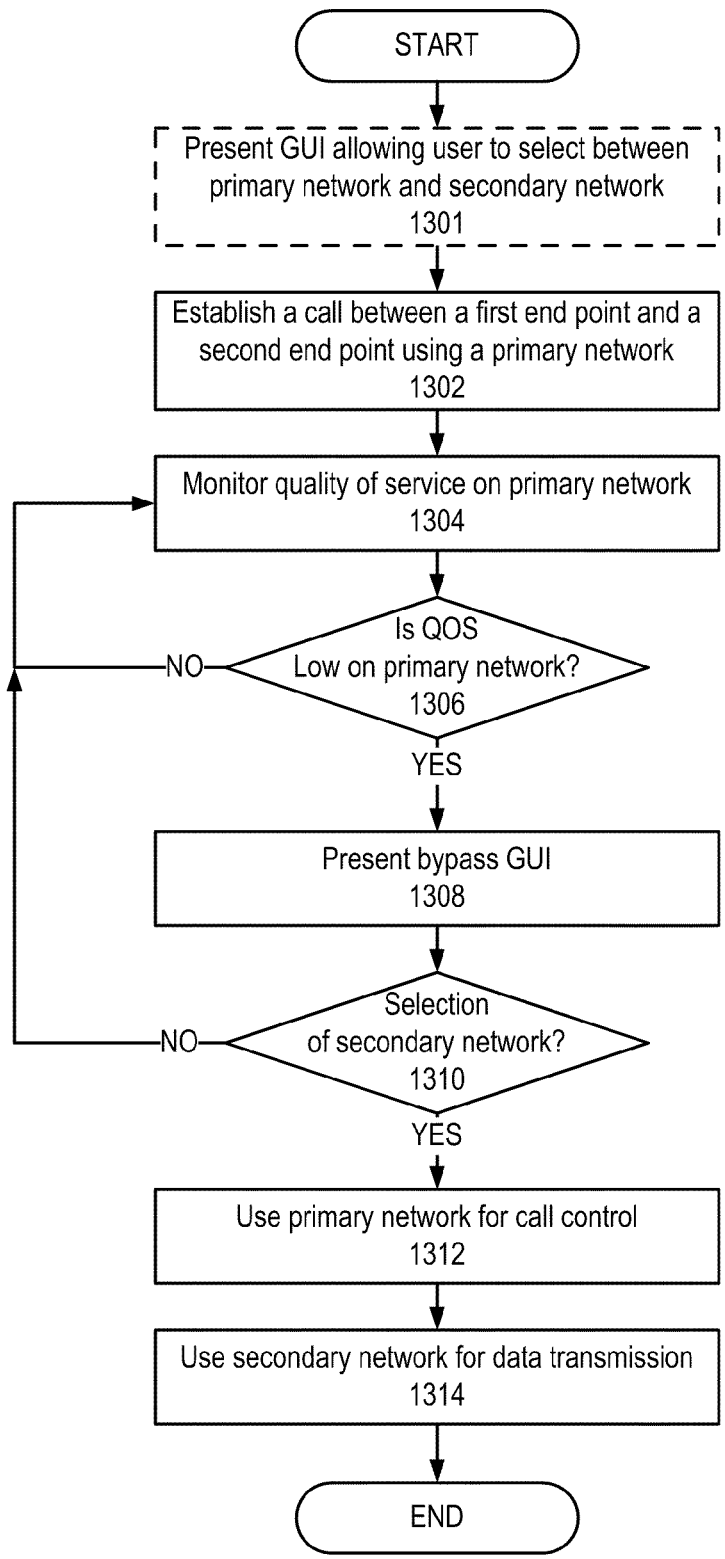
FIG. 13 is a flowchart illustrating a method for switching between primary and secondary network in response to inquest from a user via a graphical user interface according to one embodiment of the present invention.

Referring now to FIGS. 11-13, various embodiments of the method of the present invention will be described. In one embodiment (FIG. 11), the distributed telephony system 105 has been set by the administrator to automatically implement bypass on a secondary network in accordance with the present invention. In a second embodiment (FIG. 12), the distributed telephony system 105 has been set by the administrator to automatically switch to a secondary network when call quality is low and also to switch back to the primary network once call quality on the primary network has improved. In a third embodiment (FIG. 13), the distributed telephony system 105 has been set by the administrator to present an option to improve call quality to the user and bypass on a secondary network if the user selects and improve call quality option. Those skilled in the art will recognize that while these embodiments are described separately, portions of them may be combined. For example in yet another embodiment, a user may be presented with an option to switch to a secondary network to improve quality when call quality reaches a first threshold, and the system 105 may automatically transition to a secondary network when the call quality reaches a second threshold, lower than the first threshold.

Referring now to FIG. 11, a method for falling back to a secondary network to ensure call quality according to one embodiment of the present invention. The process begins with a call being initiated 1102 from a first endpoint. For example, the IP phone 202 at the first site 102 initiates a call to the IP phone 208 at the second site 104, contacting call manager 150. Call manager 150 signals the second site 104 IP phone 208, and the phone 208 accepts the call. For the present invention it is assumed that the IP network 190 is available for call control, there is an available line for the first gateway 204, an available PSTN circuit, and an available line on a second gateway 206. Otherwise, the call fails and the user is informed. The method determines 1104 whether there are any media path preferences that have been set by the administrator or user and stored in storage 810. Next, the method selects 1106 a media for the call. The default is to select the IP network 190.

Next, the call manager 150 determines 1108 a quality of service for the selected media. This determination can be made by a manual setting made by an administrator, from an admission control module 818 indicating that the network 190 is at capacity, or from a media monitoring module 802. The media monitoring module 802 utilizes network statistics indicating the network has too high a loss, latency or jitter or from call statistics from calls on the network indicating unacceptable call quality. Note that prior to the call, user and phone state information for the destination of the call may be available via the IP network 190, maintained either by call manager 150 or an external service such as presence and instant messaging services.

Next, the call manager 150 determines 1110 whether the quality of service is low and PSTN bypass should be used, or whether the user or administrator has a preference for using the PSTN bypass. The fallback to the PSTN 180 may be done either because of, network bandwidth (call quality) or user preference. If it is determined in step 1110 the quality of service is not low and there is no user preference for the secondary network, then the method uses 1112 the IP network 190 for call control and use 1114 the IP network 190 for data transmission.

If it is determined in step 1110 that either the quality of service is low or there is a preference for use of the secondary network, the method uses 1116 the IP network 190 for call control and use 1118 the secondary network, PSTN 180, for data transmission.

For example, this method may be implemented as follows. The call manager 150 places a call from the gateway 204 of the first site 102 to the gateway 206 of the second site 104. The call manager 150 informs the gateway 206 of the incoming call and passes it an identifier to disambiguate the call from other PSTN bypass calls. The call manager 150 instructs gateway 204 to transmit the identifier using the PSTN 180. For example, this may be done using a) in dual tone generated by the gateway 204 or b) ISDN out of band signaling. The gateways 204, 206 first signal to ensure that the received call is the PSTN bypass call and not another call from the PSTN 180, and to acknowledge to the originating gateway 204 of the first site 102 that it successfully connected to the gateway 206 of the second site 104. In one embodiment, the gateways 204, 206 also provide security by increasing the number characters in the identifier or even encrypting the identifier. There are multiple ways to signal in-band. DTMF is the very common in telephony and AMIS (described in the publication entitled "Audio Messaging Interchange Specification (AMIS)—Analog Protocol", Version 1, Issue 2, published in February, 1992, by the Information Industry Association, Washington, D.C.) is an example. Telephony also uses MF tones, which are equivalent to DTMF tones, but different frequencies, and in alternate embodiments are used for signaling. Faxing is yet another way to do in-band signaling, and there are a variety of modem protocols that could be used to signal between the gateways. A third method is to use modem protocols, such as Bell 202, Bell 201A, Bell 201B, Bell 103A, V.21, V.22 and others. The call manager 150 then sets up a media path between the IP phone 202 and gateway 204 of the first site 102 and between the gateway 206 and IP phone 208 of the second site 104. All features and control information are preserved between the phone users and the phones as in a normal IP call, with the exception of the media.

Referring now to FIG. 12, a method for dynamically switching between a primary and a secondary network according to one embodiment of the present invention will be described. The method begins by establishing 1202 a call between a first endpoint and a second endpoint using a primary network, for example, the IP network 190. Then the method monitors 1204 the quality of service on the primary network. This call could be purely a test call by the call manager to determine a network's quality of service, by instructing the first endpoint and a second endpoint to pass media, but not play audio out a speaker. Next method determines 1206 whether quality of service is low or there is a preference for the secondary network, for example, the PSTN 180. If quality of service is not low and there is no preference for a secondary network, the method returns to step 1204 to monitor the quality of service on the primary network and the call is maintained over the primary network. On the other hand, if quality service is low (below a threshold) or there is a preference for secondary network, the method continues to use 1208 the primary network for call control. However, the method uses 1210 the secondary network for data/media transmission. While the secondary network is being used for media transmission, the method monitors 1212 the quality of service on the primary network. The method then determines 1214 whether the quality of service is still low. (This is determined by other calls completing or in progress. There are typically a number of calls completing using the network, and the result of each is monitored.) If the quality of service continues to be low, the method returns to step 1212 to monitor the quality of service on the primary network. If the quality of service is determined to be no longer low in step 1214 (by using one or more test calls, as there would be no calls placed over the network if quality of service had been determined to be too low), the method again continues to use 1216 the IP network 190 for call control. Then the method switches 1218 back to using the IP network for data transmission after which the method continues back to step 1204 to monitor the call be of service.

Referring now to FIG. 13, a method for falling back to a secondary network in response to input from a caller or call recipient according to one embodiment of the present invention will be described. Since it is usually the caller that is charged for making a call, the below method will be described in the context where the caller is presented with the user interface and provided with the option to increase the call quality. However, those skilled in the art will recognize that in other embodiments the recipient of the call may also (or instead of the caller) be provided with a user interface that allows the recipient to increase call quality. Further, the present invention is fully described below in the context where there is an assumption that if you increase call quality is desired, the user inputs a selection and there is an additional charge for such selection of higher call quality. Furthermore, discussion related to FIG. 13 assumes that the primary network is the IP network and the secondary network is the PSTN network; and that the IP network is significantly less in cost for a call than the PSTN network. However, the IP network and the PSTN network are only used by way of example. Those skilled in the art will recognize that the IP network could be the primary network with a cellular network being the secondary network. Similarly various other combinations of networks and types of networks including, but not limited to, an IP network, a PSTN network, a cellular network or satellite network may be used in conjunction with the present invention.

In one embodiment, the method includes an optional step depicted in FIG. 13 with dashed lines as box 1301. The method presents a GUI to the user requesting a selection to use either the primary network or the secondary network for call. The GUI need not indicate the network by type but may present call options as "standard quality" for using the primary network and "enhanced quality" or "additional cost" options for using the secondary network. The method next establishes 1302 a call between a first endpoint and a second endpoint using a primary network, for example, the IP network 190. In the case, where step 1301 is included, then in step 1302, a call is established using the network selected by the user. Then the method monitors 1304 the quality of service on the primary network. In the case, where step 1301 is included, then in step 1304, monitors the quality of service on the selected network. These steps 1302, 1304 are similar to steps 1202, 1204 described above. Next, the method determines 1306 whether the quality of service (QOS) is low, for example, below predefined threshold. If quality of service is not low, the method returns to step 1304 to monitor the quality of service on the primary network and the call is maintained over the primary network. On the other hand, if quality of service is low (below the predefined threshold), the method continues by generating and presenting an interface to the user. Example embodiments of the user interface will be shown and described below with reference to FIGS. 14-16. In one embodiment, the user interface is generated by the GUI module 820 and sent by the call manager 150 to the IP phone 202/208. In another embodiment, the user interface is only sent and displayed on the IP phone 202 of the caller that initiated the call. In yet another embodiment, the user interface is only sent and displayed on the IP phone 208 of the call recipient. In still another embodiment, the user interface is displayed on both the IP phone 202 of the caller and the IP phone 208 of the recipient. Using the IP phone 202/208, the user inputs whether she would like to improve the call quality by moving the call to a secondary network. The method next determines 1310 whether the user has input a signal to transition the call to the secondary network. In one embodiment, the user interface includes a selection button (e.g., 1412 of FIG. 14) and a selection of the button by the user causes degeneration of the input signal to transition the call to the secondary network. In another embodiment, the user must depress the button a number of times (e.g., three) before the method determines that the user has decided to transition to the secondary network. If user has not input a signal to transition the call to the secondary network, the method returns to step 1304 and continues to monitor the call quality. On the other hand, if the user has selected in step 1310 the secondary network for the call, the method continues by using 1312 the primary network for call control, and using 1314 the secondary network for data transmission. Although not shown in FIG. 13, those skilled in the art will recognize that the method may be modified to monitor the quality of service on the primary network and switch back to the primary network when the quality of service can be guaranteed to be above the predefined threshold for predetermined amount of time. In this manner, the users would not be repeatedly prompted to switch back to the secondary network if there were significant transitions between levels of high and low quality on the primary network.

While the present invention has been described above with the primary network being the IP network and the secondary network being the PSTN network, there are a variety of other configurations of networks for utilizing the present invention. For example, a first user, being located in their home but using an IP phone and the Internet to connect with the second user, can select a bypass to a secondary network, and then the call is transferred from the IP network to a cellular network and the user is connected via cell phone coupled to the IP phone. In this embodiment, the IP phone is augmented with a mechanism for connecting to the cellular network such as a dongle or embedded in the phone. In certain embodiments, which secondary network to be used is collected from the user and stored in preferences when the user configures the personal call manager or their IP phone. For example, the user may be asked to input a phone number for a PSTN line or cell phone. The number to be called is collected and stored in the preferences when the user configured PCM or their IP phone. In one embodiment, the present invention is integrated with other IP telephony functionality such that the call manager 150 places the PSTN call from site to site in instances where the companies are larger and have lower rates on PSTN calls. In one embodiment, PSTN bypass functionality provided by the bypass 804 interacts with the telephony functionality of the distributed telephony system 105 to minimize the cost of the bypass call. The system 105 is either configured to automatically call from the big site to the small size, or vice versa, depending on the cost of the call. In another embodiment, the system 105 makes a determination as to which call direction provides lower-cost at the time of bypass and then uses that direction.

In a modification to the above method, the system 105 includes a billing module for monitoring costs associated with improved call quality (e.g., how often the user has opted use the secondary network to improve call quality). The GUI module 820 interacts with such a billing module, and the administrator of the system 105 sets a limit to the amount that a particular user can spend to improve call quality. In such a case, when the user has reached the preset limit, the method of FIG. 13 does not present the user with the option to increase call quality. In other words, the presentation (step 1308) of the bypass option by the GUI module 820 is not performed in step 1308 once a determination is made that the user has exceeded a preset spending limit for improved call quality/bypass calls. In another alternative embodiment, if the administrator determines that there is a likelihood of a voice quality issues, the method can automatically make the bypass call on the secondary network and not present the graphic user interface to the user. For example, this would be a combination of the methods of FIGS. 12 and 13 augmented with information from the system administrator.

Figure 14:
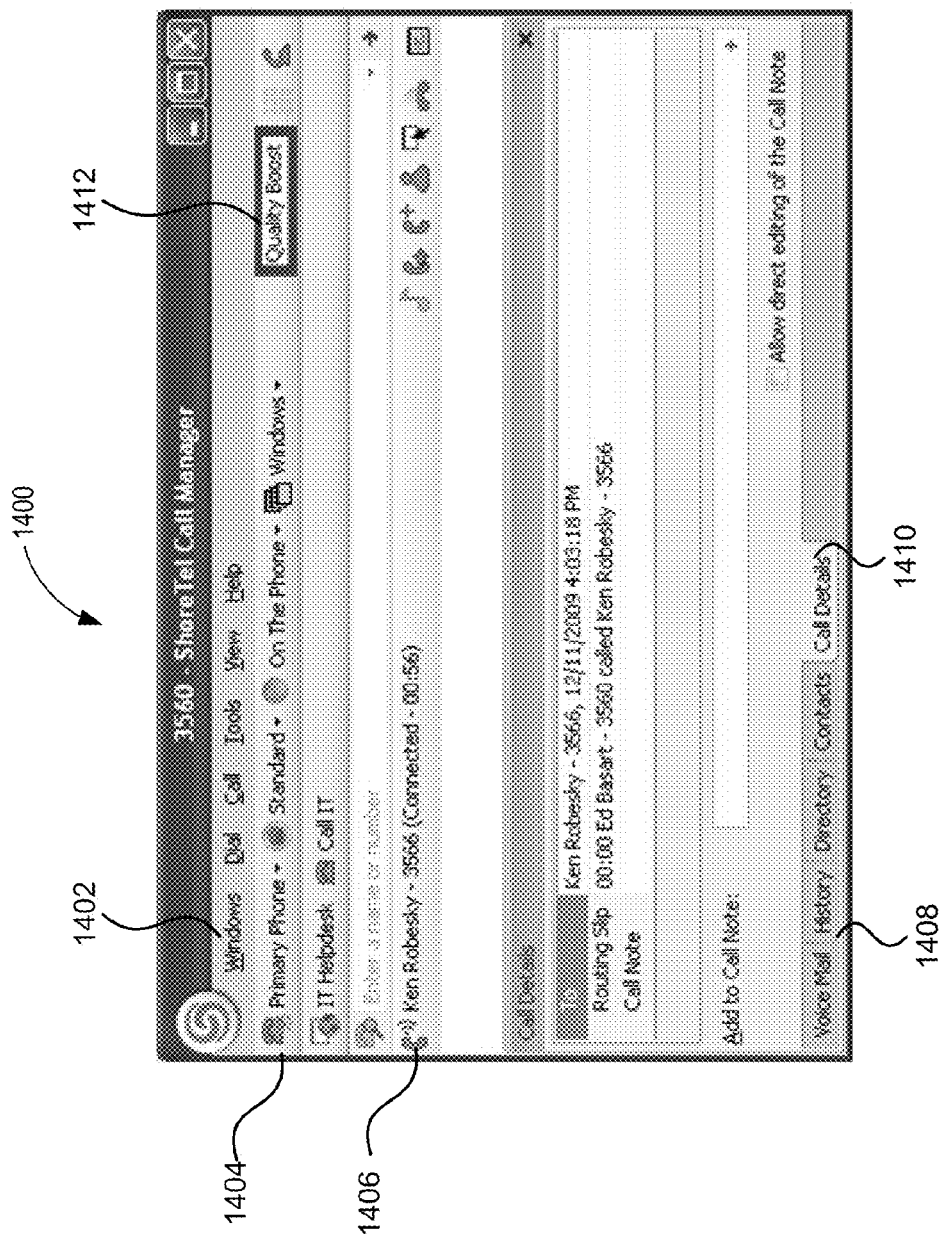
FIG. 14 is a graphical representation of a first embodiment of a display showing a graphical user interface in accordance with the present invention.

Referring now to FIG. 14, a display showing a first embodiment of a graphical user interface 1400 will be described. FIG. 14 illustrates a user interface for a personal call manager or a user interface for a personal computer interacting with the distributed IP telephony system 105. The user interface 1400 includes a window with a series of menu options 1402 near the top. The window also includes a status bar 1404 providing information about the IP telephony system 105 and one or more particular users, in particular the status bar 1404 shows presence (on the phone), call handling setting (standard), and which endpoint will ring (primary phone). Below the status bar 1404 are speed dial buttons for the IT Helpdesk and to Call IT. A portion 1406 of the user interface provides specific information about an extension such as call status information as well as a series of buttons for performing various IP telephony and other communication functions on that particular call or associated with that call. For example, the portion 1406 of the user interface shows that user 3560 (in title of GUI and in Call Details window) is speaking with Ken Robesky. The musical note symbol is a button that allows the user to place the call on hold, the handset symbol with an arrow is a button that allows the user to transfer the call, the circle and triangle shape is a button that allows the user to instant message (IM) the user on the other end point (Ken Robesky), the square with arrow is a button that adds text (or a call note) to the call (shown as Call Note) in the Call Details Window, and the red handset is a button to hang up the call. Near the bottom of the user interface 1400 window, a series of tabs 1408 are provided to access different information and functionality available on the telephony system 105 such as voicemail, history, directory, contact information and call details. The example of the interface shown in FIG. 14 has the "call details" tab selected. In accordance with the present invention, the user interface 1400 provides a selection button 1412 for improving the voice quality of a particular call. In one embodiment, the selection button 1412 is present as part of the user interface 1400 and may be selected at any time. In another embodiment, the selection button 1412 is not always visible and is only presented to the user as part of the user interface 1400 when the quality of the call is below a predefined threshold. In another embodiment, the selection button 1412 is present but not selectable. The selection button 1412 becomes selectable when the quality of the call is below the predefined threshold. In this latter case, the display attributes of the selection button 1412 are modified when the quality of the call is below the predefined threshold, and therefore, selectable. For example, the selection button 1412 may appear as a normal button with no highlighting in normal state. However, when the quality of the call is below the predefined threshold, the selection button 1412 is displayed with a red border as shown in FIG. 14. Those skilled in the art will recognize that there are a variety of ways in which to show the selection button 1412 with visually distinct and different appearance so the user knows when the selection button 1412 is capable of being selected.

Those skilled in the art will recognize that the graphical user interface 1400 represents a graphical unified communications application operable on a personal computer and used in conjunction with a VoIP system. In one embodiment, the two endpoints 202, 208 both are operating a graphical unified communications application with enhanced features such as instant messaging, presence, application desktop sharing etc. In accordance with the present invention, if the IP network 190 has a quality level below a predefined threshold (e.g., the IP network is determined as unable to transmit voice), the system and method continue to use the IP network 190 for call control and non real-time communications while the voice is transmitted over the secondary network. Thus, the present invention preserves the richness of the unified communication while also maintaining the quality of the voice portion of the call.

Figure 15:
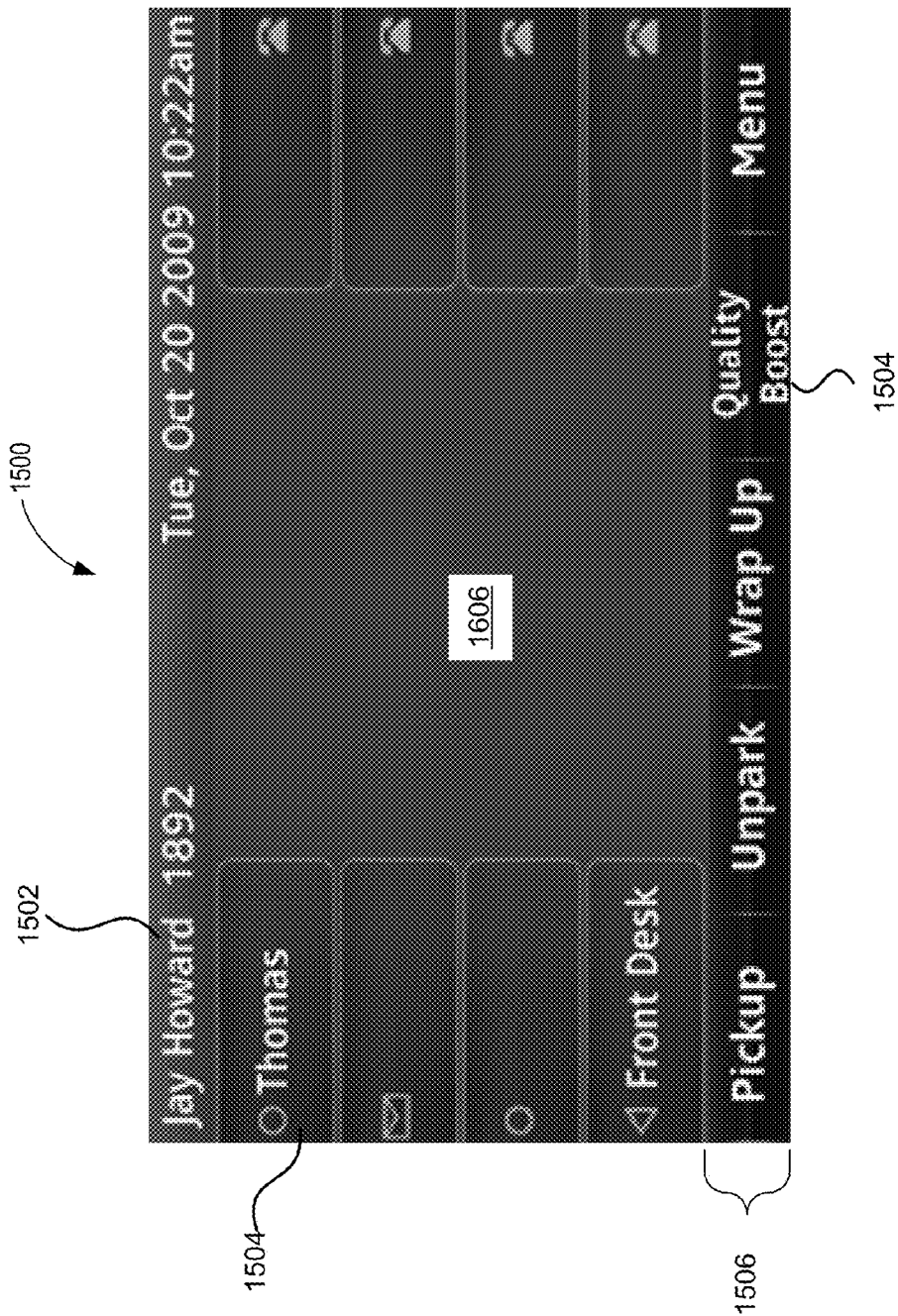
FIG. 15 is a graphical representation of a second embodiment of a display showing a graphical user interface in a first state in accordance with the present invention.
Figure 16:
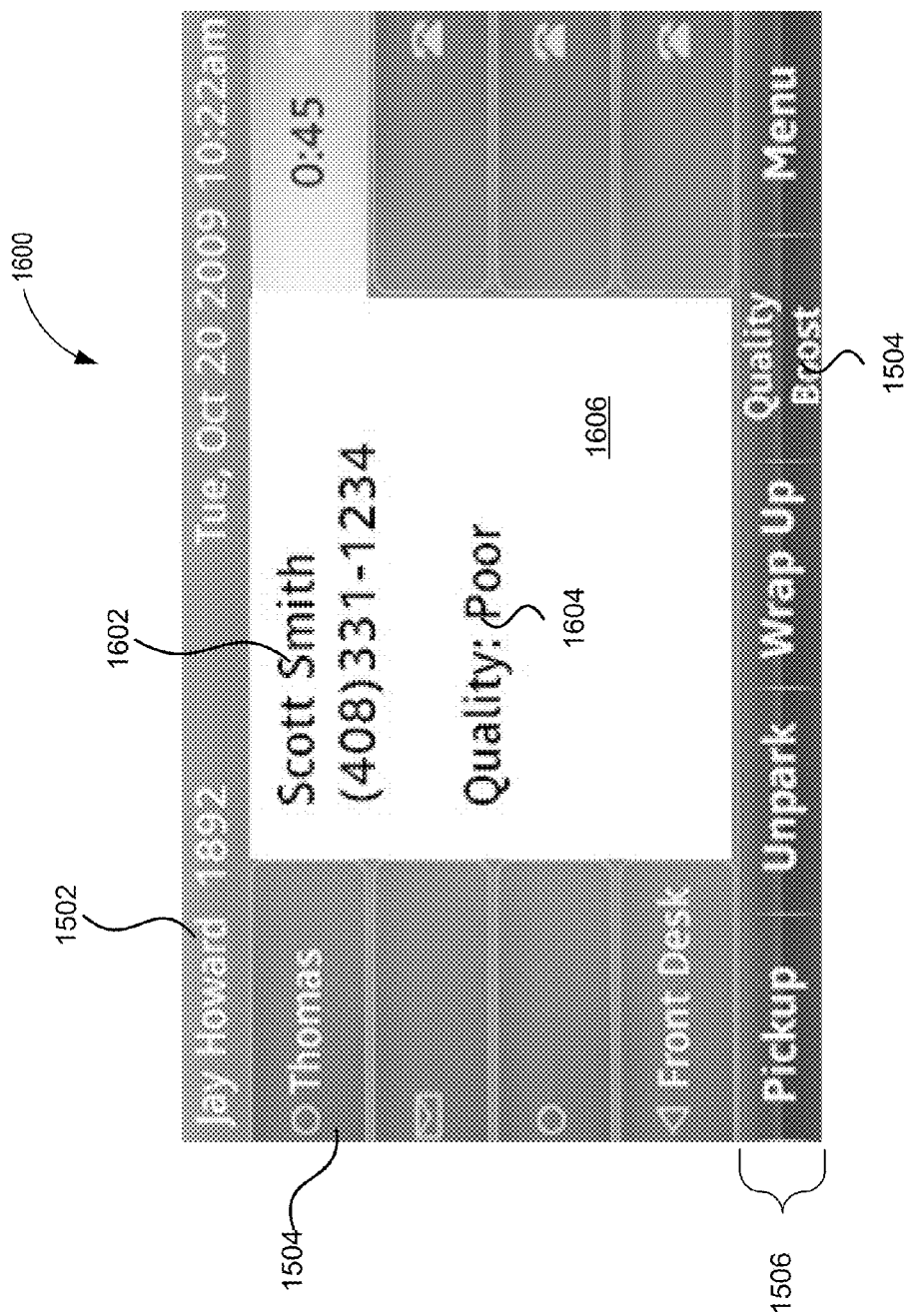
FIG. 16 is graphical representation of the second embodiment of the display showing the graphical user interface in a second state in accordance with the present invention.

Referring now to FIGS. 15 and 16, a display showing a second embodiment of a user interface 1500, 1600 will be described. The second embodiment of a user interface 1500, 1600 is for the display of an IP telephone 202. FIG. 15 shows the second embodiment of the graphical user interface 1500 in a first normal operating state, and FIG. 16 shows the second embodiment of the graphical user interface 1600 in a second state where poor quality of voice signal has been detected for the call. Referring now to FIG. 15, one example of the user interface 1500 for an IP phone 202 is shown. The user interface 1500 includes a top row 1502 of information including the name of the person corresponding to the extension, an extension number, day, date and time. The user interface 1500 includes a display area 1606 in a center location in which information about calls is displayed. Along the left side of the user interface 1500, a series of buttons 1504 are provided to for one touch dialing of other users or voicemail. Along the right side of the user interface 1500, a series of status indicators for phone lines indicate which lines are active and their status. Along the bottom of the user interface 1500 are a series of buttons 1506 for accessing various telephony the functions such as picking up the call, on parking the call, wrap up, and accessing a menu of additional information and features of the system 105. In accordance with the present invention a selection button 1504 labeled "quality boost" is provided. The selection button 1504 can be selected by the user to switch from the primary network to the secondary network. In certain circumstances, the user is unaware of the network being used for the call, and only knows that the voice quality of the calls improved when selection button 1504 is activated. Referring now also to FIG. 16, the second embodiment of the user interface 1600 is shown. The differences between FIG. 15 and FIG. 16 illustrate the operation of the second embodiment of the user interface 1500, 1600. FIG. 16 shows the user interface 1600 for the same IP phone 202 as shown in FIG. 15. However, the user interface 1600 is in a state where the extension is active with a call to another user as indicated by a caller name and number 1602 in the display area 1606 near the center of the user interface 1600. At this particular point in time, there is also information about call quality 1604 in display area 1606 of the user interface 1600. Once the user views the indication of poor quality, the user can select the quality boost button 1504. In response, the system 105 will cause a transition to the secondary network. Although not shown, the display area 1606 may also indicate that the selection button 1504 has been selected and that there will be a charge for the improvement in quality. Further in one embodiment, the display areas 1606 can include a meter that indicates the dollar amount of charges that are being incurred by the user from selection of the selection button 1504. This meter is a dollar amount indicated that increases with time similar to the call length indicator in the active line on the right side of the user interface 1600. In yet another embodiment, the system 105 may require that the user confirm selection of the quality boost button 1504. In such an embodiment, the display area 1606 would display information that improvement in quality has associated fees or charges and request confirmation from the user. In response the user would be required to select the quality boost button 1504 or one of the buttons on the left side to confirm they want to switch to the secondary network to improve quality and are willing to pay the associated fees.

Cloud Computing VoIP System

Referring now to FIGS. 2H-2L, embodiments of the cloud computing VoIP system 200H-200L will be described in more detail.

Figure 2H:
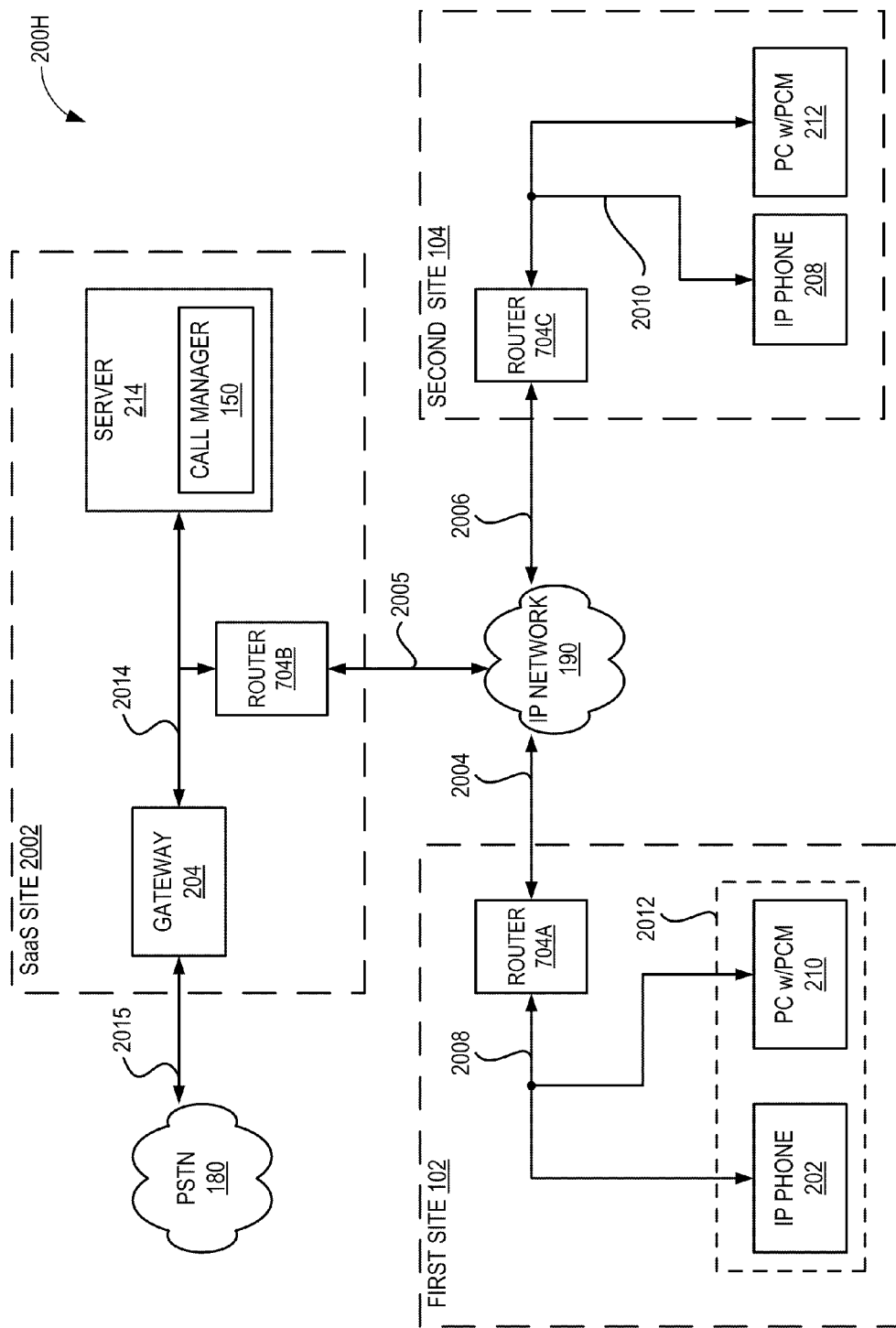
FIG. 2H is a block diagram illustrating a cloud computing VoIP system having a SaaS site, a first site and a second site configured according to an embodiment of the present invention.

FIG. 2H shows one embodiment of a cloud computing VoIP system 200H including a SaaS site 2002, the first site 102, the second site 104, the PSTN 180 and an IP network 190 configured according to an embodiment of the present invention. The PSTN 180 and the IP network 190 have the same or similar functionality to that described above so that description will not be repeated here. Although not shown, those skilled in the art will recognize that the PSTN 180 could be connected to a variety of other endpoints including traditional endpoints (phones), IP phones, as well as other networks and gateways of other sites for connection to additional IP phones. Similarly, the IP network 190 is coupled to other networks and sites not shown.

Although only a first site 102 and a second site 104 are shown in FIG. 2H, those skilled in their art will recognize that any number of additional sides and additional IP phones could be coupled to the SaaS site 2002 to provide the same or similar functionality to those additional sites. This is particularly advantageous because this allows VoIP services to be offered on a Software as a Service model. Thus, users such as small businesses need only purchase IP phones 202, 208 and router 704 to utilize the voice and data communication services that include advanced call features offered by the SaaS site 2002. This is particularly advantageous to the end user because none of the technical expertise, costs, or other requirements necessary to operate and enterprise-level VoIP system are required.

The SaaS or shared site 2002 includes a gateway 204, a router 704B and a server 214 having a call manager 150. The SaaS site 2002 is a shared site in that the resources and call control functionality may be used by many different other sites, organizations and users. For example, the SaaS or shared site 2002 could be used by hundreds of different small businesses each having a corresponding site with only a few IP phones 202, 208. The SaaS site 2002 is particularly advantageous because it provides VoIP calling functionality including advanced calling features to various endpoints coupled to it, especially those at remote sites 102, 104. The gateway 204 is coupled by signal line 2015 to the PSTN 180 for access to the conventional public telephone system. The router 704B is coupled by signal line 2005 to the IP network 190. The router 704B is also coupled to the gateway 204 and the server 214 by signal line 2014 and thereby provides the functionality of a VoIP system to other endpoints connected to the SaaS site 2002 by the IP network 190. The call manager 150 and the gateway 204 have the same or similar functionality to the call manager 150 and the gateways 204, 206 described above so that description will not be repeated here. In one embodiment, the call manager 150 is software operational on a hardware server 214. The router 704B is of a conventional type such has been described above with reference to FIG. 7 and is used to transmit and receive IP packets and other data. Although only a single server 214, call manager 150, gateway 204 and router 704B are shown in FIG. 2H, those skilled the art will recognize that the SaaS or shared site 2002 may include any number of gateways 204, routers 704B, servers 214 or call managers 150 and a variety of different combinations as necessary to provide VoIP telephony services in a software as a service model. The single shared site 2002 is particularly advantageous because the cost of operating the shared site 2002 can be distributed over the hundreds of businesses, thereby reducing the cost of operation to any one individual business.

In this embodiment, the first site 102 includes a router 704A, an IP phone 202 and a computing device (e.g., personal computer or PC) including a personal call manager (PCM) 210. The router 704A is coupled by signal line 2004 to the IP network 190. The router 704A is also coupled by signal line 2008 to the IP phone 202 and the PC 210. For example, signal line 2008 represents a local area network of the first site 102. The IP phone 202 and the PC 210 with a personal call manager cooperate with each other as an endpoint 2012. The association is made in a database consulted by the call manager 150. For example, for a telephone call, the IP media is coupled to the IP phone 202 via the router and IP network 190 while call control and advanced features are controlled and provided by PC 210. Thus, the IP phone 202 and the PC 210 are shown as a single endpoint 2012 in FIG. 2H by dashed lines. The IP phone 202 and the personal computer 210 with the person call manager operate in a conventional manner such as in existing systems offered by ShoreTel, Inc. of Sunnyvale, Calif. While the first site 102 shows only a single endpoint 2012, those skilled the art will recognize that the first site 102 could include any number of additional IP phones and associated personal computers 210 with personal call managers even though only one IP phone 202 and one personal computer 210 is shown. Moreover, the first site 102 may also include one or more IP phones 202 without an associated PC 210 and PCM.

The second site 104 includes a router 704C, an IP phone 208 and a personal computer 212 with a personal call manager. The router 704C is coupled to the IP network 190 by signal line 2006. The IP phone 208 and the personal computer 212 or coupled to the router 704C by signal line 2010. In this embodiment, the signal line 2010 represents a local area network of the second site 104. These components of the second site 104 have the same or similar functionality to like named components of the first site 102. Moreover, the second site 104 could include any number of additional IP phones and associated personal call managers. Those skilled in the art will recognize that a call between IP phone 202 and IP phone 208 is controlled by the call manager 150 of the SaaS site 2002. Likewise, for both the first and second site 102, 104 calls over the IP network 190 and to phones coupled to the PSTN 180 are controlled and established by the call manager 150 utilizing gateway 204.

Those skilled in the art will recognize that while the SaaS site 2002 is shown as a single site, alternate embodiments of the system 200H include multiple SaaS site 2002 or the functionality, hardware and software for performing call management, call control and call routing is distributed across multiple data centers all interconnected to IP network 190. Relative to the first site 102 in the second site 104, the multiple SaaS site 2002 or distributed data centers appear to be operating in the cloud. Such a configuration is particularly advantageous because it allows the multiple SaaS sites 2002 to be scalable to meet the demands of hundreds of thousands of small businesses. Such configuration and architecture is particularly advantageous because it achieves economies of scale by allowing a common database (in some cases even redundant databases) to be used for multiple call managers 150. Furthermore, this configuration also provides significant fault tolerance because if a single call manager fails, another call manager located at another data center can access the common database and provide immediate failover and disaster recovery by using multiple SaaS sites 2002. Whenever a call manager 150 fails, the system 200H fails over to a backup call manager 150, and the backup call manager 150 is in a different SaaS 2002 site. In another embodiment, a "standby SaaS site waiting for disaster" is provided by provisioning the call managers 150 in the database to use call managers in "primary" SaaS sites and thus the disaster recovery call manager(s) will be in standby. Each call manager 150 may have one or more backups.

Referring now to FIGS. 2I-2L, different embodiments of a cloud computing VoIP system having the SaaS site 2002, the first site 102, the second site 104 and a secondary network (cellular network 250) configured for failover according to the present invention will be described.

Figure 2I:
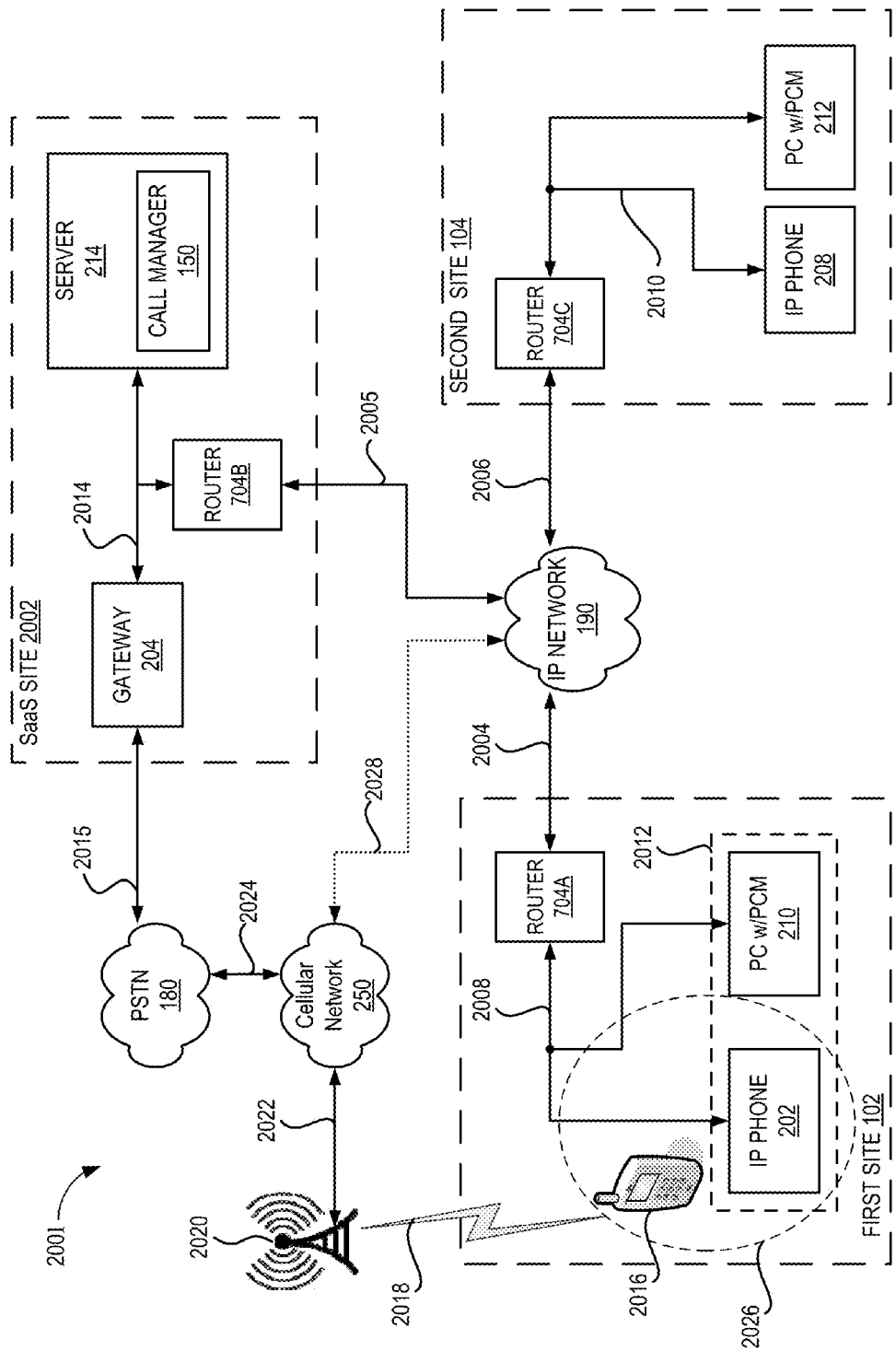
FIGS. 2I-2L are block diagrams illustrating a cloud computing VoIP system having a SaaS site, a first site, a second site and a secondary network configured according to different embodiments of the present invention.

FIG. 2I shows an embodiment of a cloud computing VoIP system 200I configured for failover according to the present invention. This embodiment of the cloud computing VoIP system 200I comprises the SaaS site 2002, the first site 102, the second site 104, the PSTN 180 and an IP network 190. This embodiment of the system 200I includes similar components to the embodiment of the cloud computing VoIP system 200H of FIG. 2H described above so that description will not be repeated here. Like reference numerals have been used for like components with similar functionality. In particular, the SaaS site 2002, the PSTN 180, the IP network 190, and the second site 104 have similar functionality and coupling as has been described above with reference to FIG. 2H.

However, this embodiment of the system 200I depicts an example topology where the cloud computing VoIP system 200I also includes a cellular network 250, a cell tower 2020 and a mobile phone 2016 to provide a failover path for communication and control. The first site 102 includes the mobile phone 2016 in addition to the router 704A, the IP phone 202 and the PC 210 with a personal call manager. Again, the router 704A, the IP phone 202 and the PC 210 with a personal call manager were described above with reference to FIG. 2H and have a similar functionality here. The mobile phone 2016 and the endpoint 2012 (IP phone 202) are associated with a user as represented by the dashed lines 2026. In one embodiment, the call manager 150 includes a database that associates the user with an IP phone 202. The database also associates the PC with PCM 210 with a user and a mobile phone 2016 with the user. In other embodiments, the mobile phone 2016 and the endpoint 2012 are associated by communicating with each other using near field communication (e.g., Bluetooth) or a direct connection by docking the mobile phone 2016 and this information is sent by the PC with PCM 210 or the IP phone 202 to the call manager 150. Similarly, the PC with PCM 210 or the IP phone 202 responsible for communicating to the call manager 150 when the mobile phone 2016 is in proximity and again when it's not in proximity. In yet another embodiment, the mobile phone 2016 includes a router and Wi-Fi communication capability. The mobile phone 2016 can then directly communicate an association and call control with the call manager 150 using its Wi-Fi communication capability and the cellular network 250. In still another embodiment, the router of the mobile phone 2016 can be used to provide failover to any IP Phone by granting access to the mobile phone's router.

The mobile phone 2016 is wirelessly coupled by signal line 2018 for communication to the cell tower 2020. In turn, the cell tower 2020 is coupled by signal line 2022 to the cellular network 250. The cell tower 2020 and the cellular network 250 are conventional types known to those skilled in the art and merely representative of any cell tower or any cellular network. In one embodiment, the cellular network 250 is coupled by signal line 2024 to the PSTN 180 thereby providing a secondary communication path for IP media to the IP network 190 via the mobile phone 2016, the cell tower 2020, the cellular network 250, the PSTN 180, the gateway 204 and router 704B. Those skilled in the art will recognize that other gateways (not shown) may be used as the communication path between the PSTN 180 and the IP network 190 rather than traversing the SaaS site 2002. In another embodiment, the cellular network 250 is coupled by signal line 2028 (shown with a dashed line) to the IP network 190 directly transmits IP media without having to traverse the gateway 204 and the router 704B. In either embodiment, the cellular network 250 is coupled either through the gateway 204 or the router 704B to the call manager 150 of the SaaS site 2002 for call control. Therefore, as shown in FIG. 2I, the mobile phone 2016, cell tower 2020 and the cellular network 250 provide a secondary communication path through the PSTN 180 or the IP network 190. In yet another embodiment, the router 704A and the IP network 190 continue to be used even with reduced quality of service for call control while the signification path is used for transmission of the IP media. In yet another embodiment, the data channel of the cellular network 250 (e.g., Short Message Service (SMS) or Multimedia Messaging Service (MMS)) is used for call control, and the call is placed over the cellular network 250, thereby allowing fall back even when there is no IP network 190 connection whatsoever.

Figure 2J:
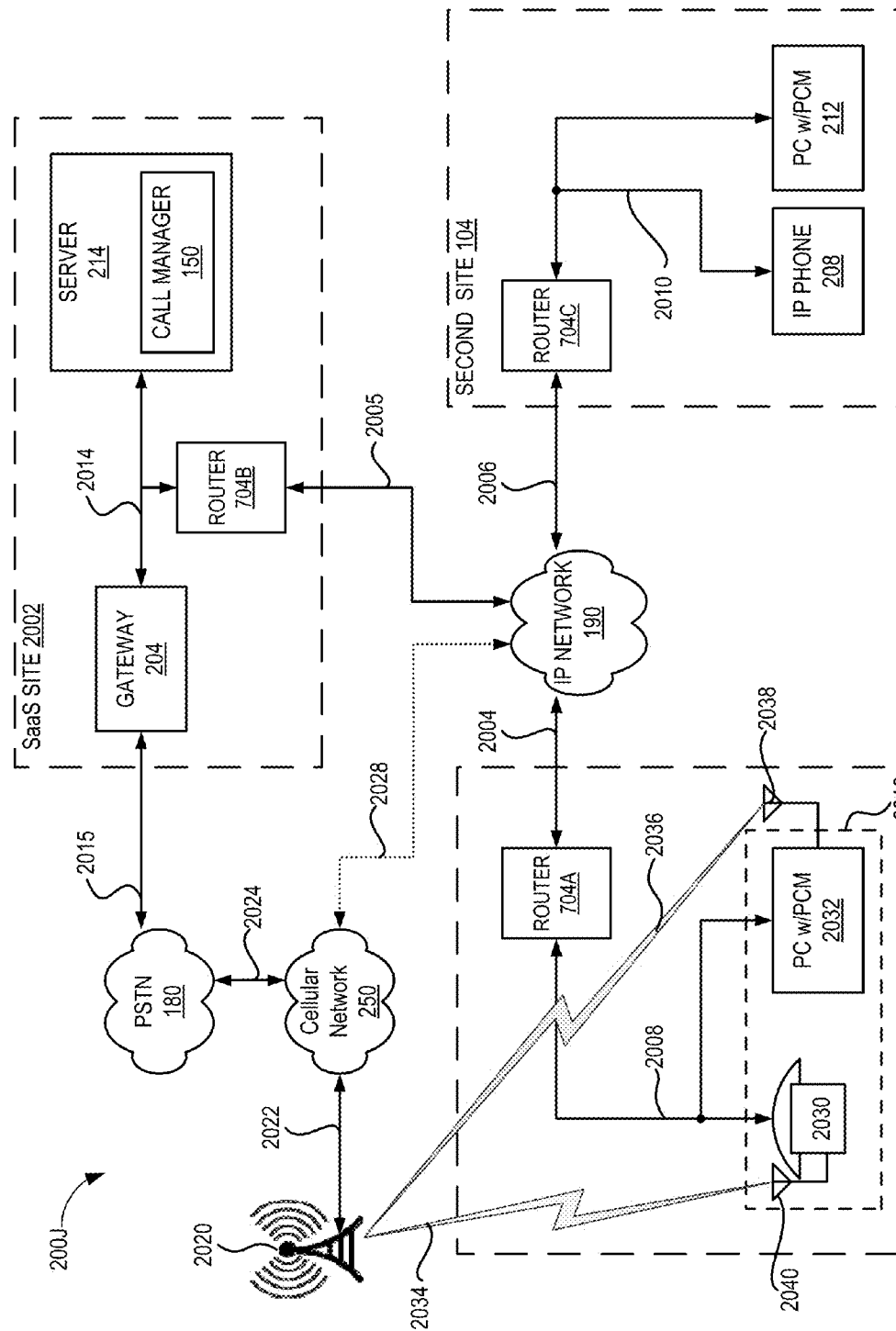

FIG. 2J shows another embodiment of a cloud computing VoIP system 200J configured for failover according to the present invention. This embodiment of the cloud computing VoIP system 200J comprises the SaaS site 2002, the first site 102, the second site 104, the PSTN 180, the IP network 190, the cell tower 2020 and a cellular network 250. This embodiment of the system 200J includes similar components to the embodiment of the cloud computing VoIP system 200I of FIG. 2I described above so that description will not be repeated here. Like reference numerals have been used for like components with similar functionality.

In this embodiment of the cloud computing VoIP system 200J, the secondary network is again provided by the cell tower 2020 and a cellular network 250. Unlike the embodiment in FIG. 2I, no independent mobile phone is required or need be associated with the endpoint 2012. However, the first site 102 includes an IP phone 2030 having a cellular radio and antenna 2040. Such an IP phone 2030 is able to communicate with other endpoints using either VoIP via signal line 2008 and IP network 190 or wirelessly via the cellular network 250. The IP phone 2030 is coupled to the router 704A by signal line 2008 (e.g., a LAN). The IP phone 2030 is also wirelessly coupled 2034 to the cell tower 2020. The first site 102 also includes a PC 2032 with a cellular radio and antenna 2038. Similarly, the PC 2032 can communicate using a TCP/IP protocol over the local area network 2008, router 704A and IP network 190. The PC 2032 can also communicate using its cellular radio and antenna 2038. The cellular radio and antenna 2038 are wirelessly coupled 2036 to the cell tower 2020. The alternate communication paths for the IP phone 2030 and the PC 2032 via the cellular network 250 allow the cellular network 250 to be used for both the IP media and call control in the event there is a quality degradation or failure of the local area network 2008, the connection 2004 to the IP network 190 or other bandwidth limitations across the IP network 190. In yet another embodiment, the IP phone 2030 is a mobile dual-mode VoIP phone that includes a Wi-Fi transceiver for communicating with a wireless router and a cell radio for communicating with the cellular network 250. Similarly in yet another embodiment, the PC 2032 is a portable laptop or tablet having a Wi-Fi transceiver for communicating with the router and a wireless modem for communicating with the cellular network 250.

Figure 2K:
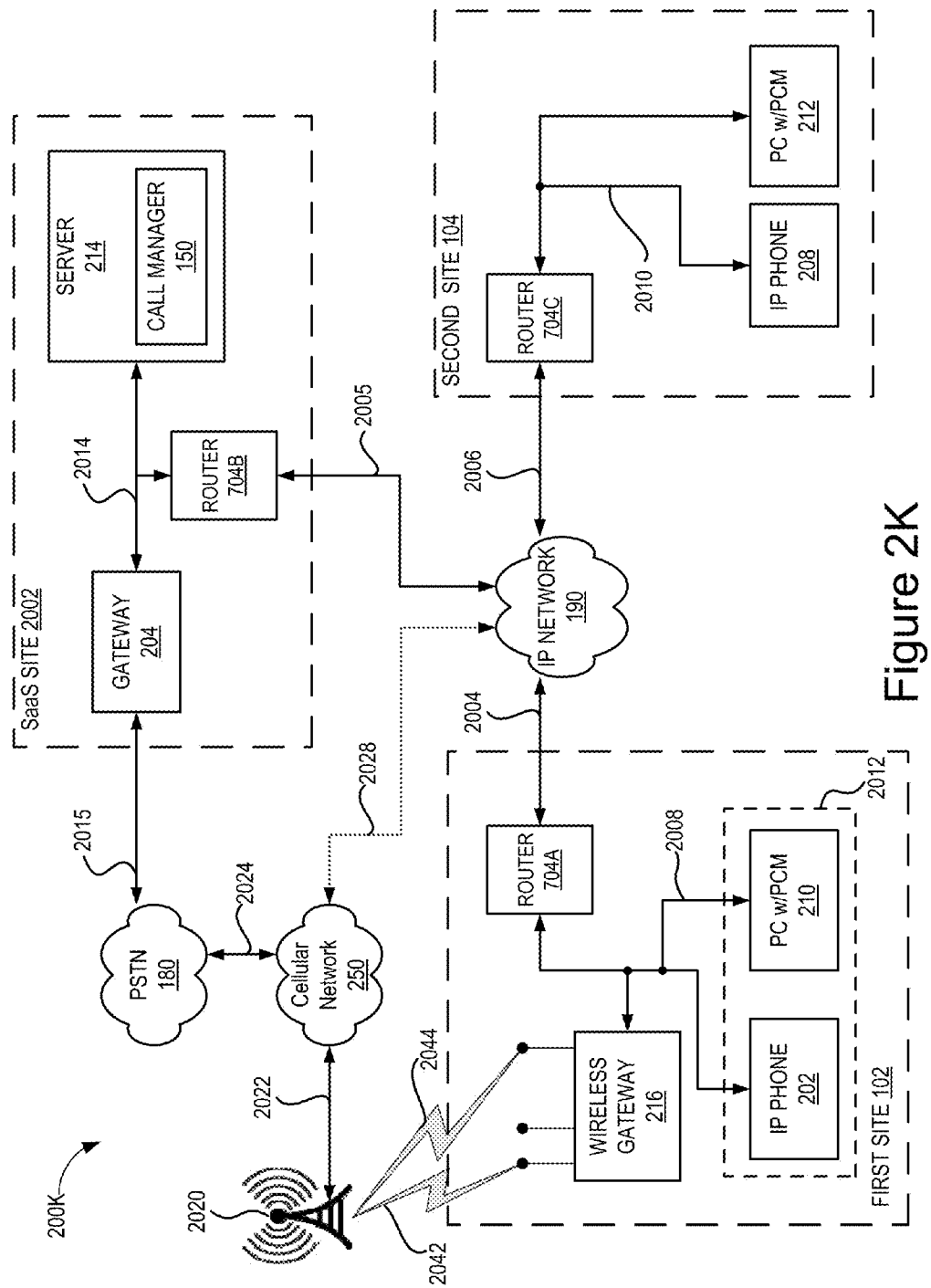

FIG. 2K shows another embodiment of a cloud computing VoIP system 200K configured for failover according to the present invention. This embodiment of the cloud computing VoIP system 200K comprises the SaaS site 2002, the first site 102, the second site 104, the PSTN 180, the IP network 190, the cell tower 2020 and a cellular network 250. This embodiment of the system 200K includes similar components to the embodiment of the cloud computing VoIP system 200I of FIG. 2I described above so that description will not be repeated here. Like reference numerals have been used for like components with similar functionality.

In this embodiment, the first site 102 includes a wireless gateway 216. The wireless gateway 216 is coupled to the router 704A, the IP phone 202 and the PC 210 by signal line 2008. The wireless gateway 216 provides a coupling between the cellular network 250 and the local area network 2008. In one embodiment, the wireless gateway 216 includes a router, translation protocols and software, and a plurality of cellular radios. The wireless gateway is coupled to signal line 2008 for communication with the router 704A, the IP phone 202 and the PC 210 using the TCP/IP protocol. The wireless gateway 216 is wirelessly coupled 2042, 2044 to the cell tower 2020. The wireless gateway 216 is adapted to maintain a plurality of calls between a plurality of endpoints at the first site 102 and other endpoints (not shown) over the cellular network 250. Although only a single IP phone 202 is shown in the first site 102, those skilled in the art will recognize the first site 102 could include several or even hundreds of IP phones. The wireless gateway 216 includes enough cellular radios to provide a secondary channel for several IP phones simultaneously. This architecture is particularly advantageous because existing endpoints can be used unmodified and the only modification needed to the first site 102 is the addition of the wireless gateway 216. Those skilled in the art will recognize that while the wireless gateway 216 has been described above is including a plurality of cellular radios, these could be replaced by a communication channel to the IP network 190 such as using fixed wireless, satellite communication or Worldwide Interoperability for Microwave Access (WiMAX). In such embodiments, the wireless gateway 216 would continue to include a router but also be adapted with protocols and communication devices specific to fixed wireless, satellite communications and WiMAX.

Figure 2L:
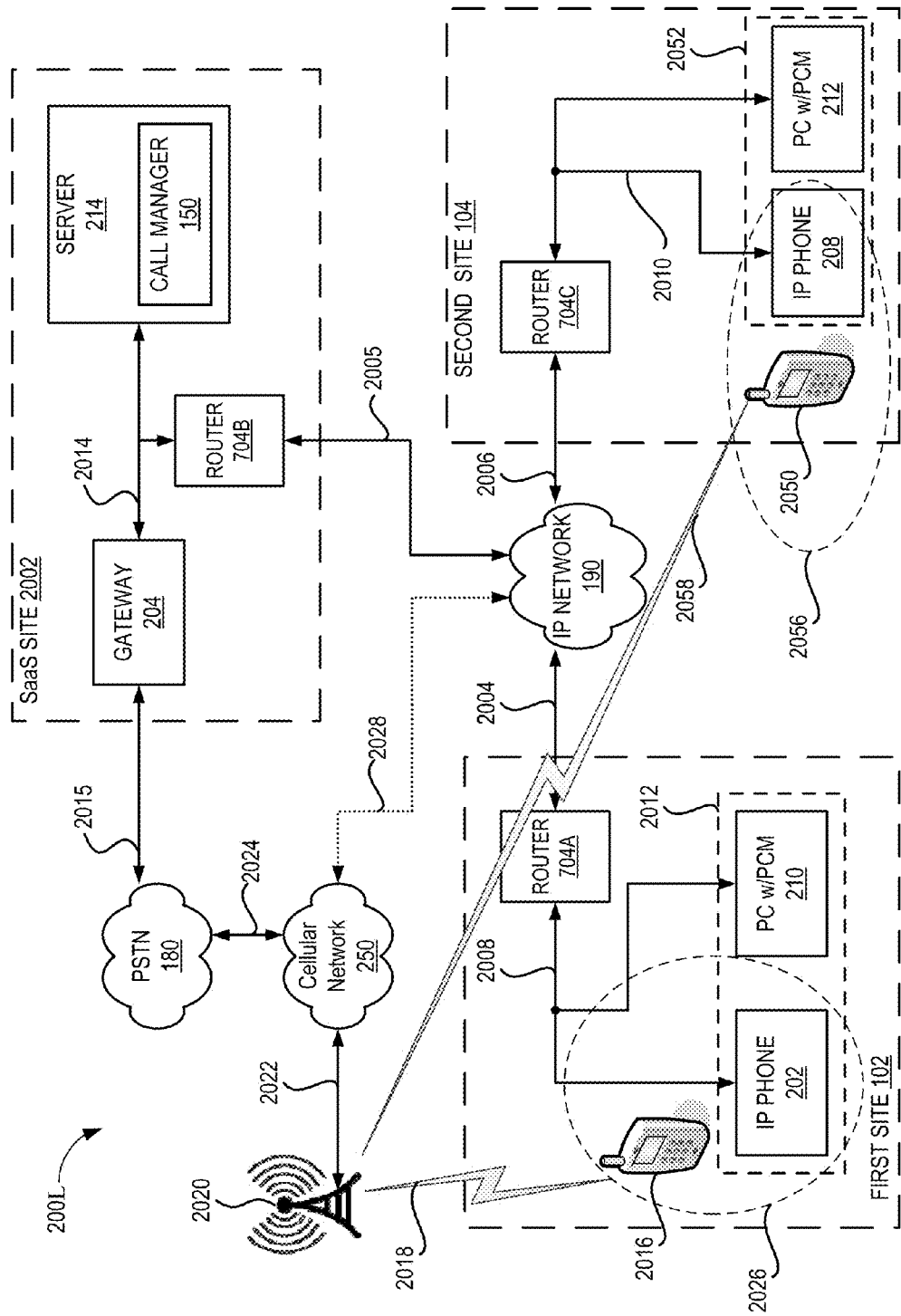

FIG. 2L shows another embodiment of a cloud computing VoIP system 200L configured for failover according to the present invention. This embodiment of the cloud computing VoIP system 200L comprises the SaaS site 2002, the first site 102, the second site 104, the PSTN 180, the IP network 190, the cell tower 2020 and a cellular network 250. This embodiment of the system 200L includes similar components to the embodiment of the cloud computing VoIP system 200I of FIG. 2I described above so that description will not be repeated here. Like reference numerals have been used for like components with similar functionality. FIG. 2L illustrates an embodiment with multiple IP phones 202, 208 and multiple mobile phone 2016, 2050 where an IP phone 202, 208 and a mobile phone 2016, 2050 are associated with a user, respectively. The advantage of associating the user with the IP phone 202 and the mobile phone 2016 is that a user can be bound to a different phone at a different time. Multiple users can share the same phone. So, the present invention advantageously associates a phone with a user, associates a mobile phone with a user, and also associates a PC with PCM with that user. Those skilled in the art will recognize that the association can also be by phone 202, 208. For example, at the second site 104 the IP phone 208 and the PC 212 cooperates such that the IP phone receives IP media and the PC 212 performs call control for the IP phone 208. In other embodiments the IP phone 208 can also perform call control. Similar to the IP phone 202 at the first site 102, the mobile phone 2050 and the IP phone 208 are associated with a user and can be used for a bypass path when the quality of service through the router 704C degrades or is nonexistent. The second mobile phone 2050 is wirelessly coupled 2058 for communication with the cell tower 2020. Thus, those skilled in the art will recognize that this architecture is particularly advantageous because a call between IP phone 202 and IP phone 208 can be maintained regardless of where the quality of service degradation or network failure occurs. For example, if there is quality of service degradation or network failure along signal line 2004, IP phone 208 continues to maintain the call using IP network 190 and router 704C while IP phone 202 uses cell phone 2016 and the bypass path through the cellular network 250 to maintain a call. If on the other hand, the quality of service degradation or network failure is along signal line 2006, the roles are reversed and IP phone 202 continues to maintain the call using the IP network 190 and router 704A while IP phone 208 uses the cellular phone 2050 and the bypass path through the cellular network 250 to maintain the call. Furthermore, if the quality of service degradation or network failure is along signal line 2005, the two bypass paths via the cellular network 250 are used to maintain the call. In such an example, the cellular network is used for both call control and delivery of the IP media.

Figure 17:
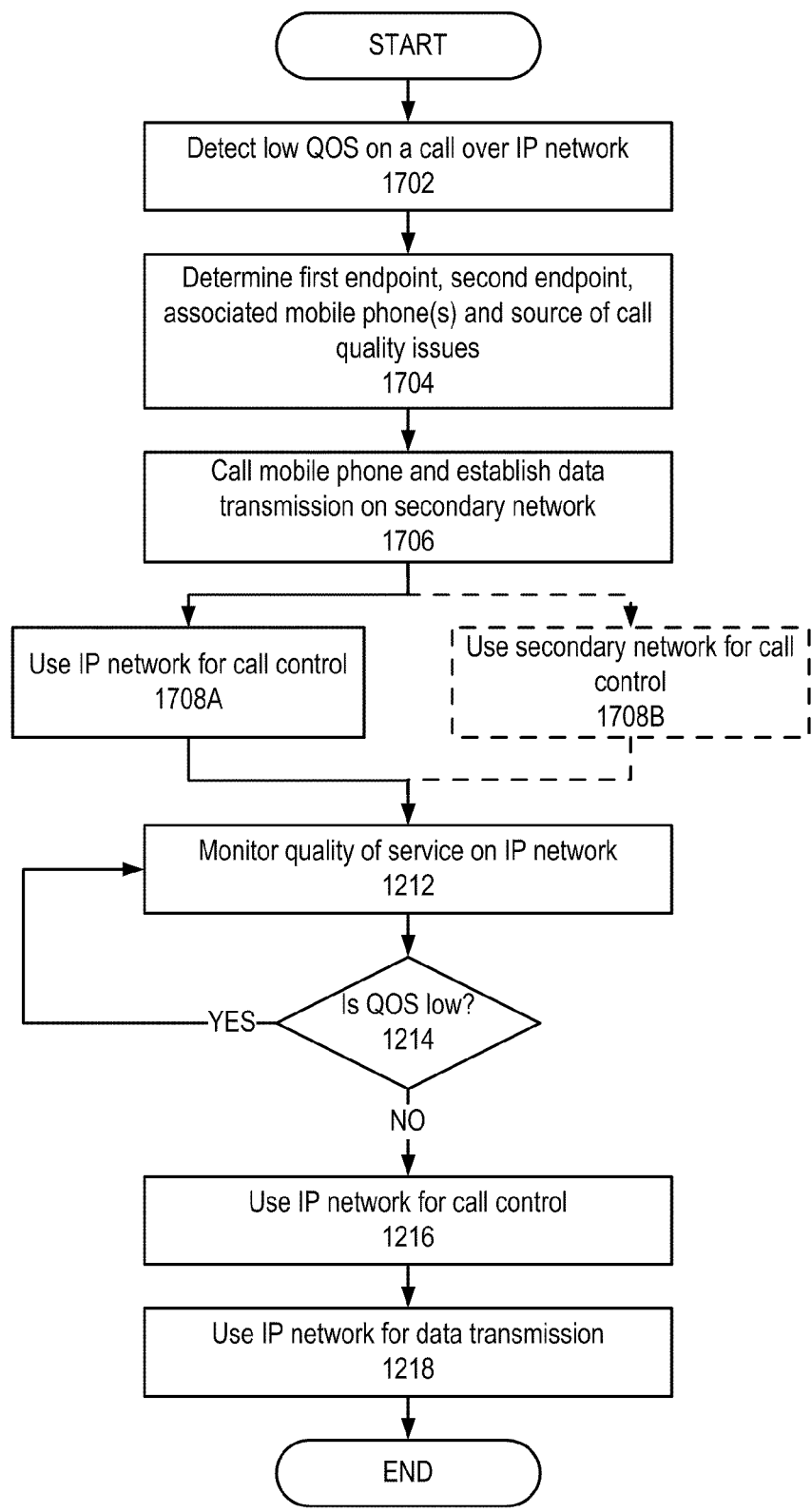
FIG. 17 is a flowchart illustrating a method for dynamically switching between a primary and a secondary network to ensure call quality according to another embodiment of the present invention.

Referring now to FIG. 17, a method for dynamically switching between a primary (IP) network and a secondary (cellular) network to ensure call quality according utilizing the architectures of shown in FIGS. 2I to 2K will be described. The method begins by detecting 1702 low quality of service on call over the IP network being managed by the call manager 150. For example, the call manager 150 will routinely monitor the quality of service for a call between two endpoints. If the quality of the call is below a predefined threshold, the call manager 150 will detect this low level of service. Once a low quality of service has been detected, the method continues by determining 1704 the first endpoint, the second endpoint, the mobile phone(s) 2016, cellular radio(s) 2040 or wireless gateway(s) 216 associated with the endpoints. For the case of a call between a PSTN caller and the IP phone 202, the problem is known to be between the gateway 204 in the cloud (SaaS site 2002) and the IP phone 202 at the first site 102. However for calls between two IP phones 202, 208, the call manager 150 sends pings or test packets that are similar to voice packets to and from each phone 202, 208 and whichever phone 202, 208, has poor quality of service or no connection, is re-routed over the bypass path. A method for determining the source of call quality issues or connection issues is described below with reference to FIG. 18. This method will identify whether the source of call quality issues is the connection to the first endpoint, the connection to the second endpoint, or the connection of the call manager 150, in other words the SaaS site 2002 to the network 190. In this example, we are assuming that the call quality issues are caused by issues related to the first endpoint. However, if the call quality issues are caused by issues related to the second endpoint, the mobile phone associated with that second endpoint is used in the same manner as will be described below for the first endpoint. If the call quality issues are caused by issues related to the connection of the call manager 150 to the endpoints, then mobile phones associated with both endpoints will be used to maintain the call. Next, the call manager 150 calls 1706 the mobile phone 2016 and establishes a call between the mobile phone 2016 and the second endpoint. In one embodiment where the IP network 190 is still operational but has diminished quality of service, the call manager 150 uses 1708A the IP network 190 for call control. In an alternate embodiment as shown with dashed lines in FIG. 17 and where there is no communication over the IP network 190 via the router 704A, the call manager 150 uses 1708B the secondary network for call control. After step 1708, the call including call control is effectively switched over to the secondary network. The call manager 150 continues to monitor 1212 the quality of service on the IP network 190. The call manager 150 operates as has been described above with reference to FIG. 12, and monitors the IP network 190 for improved call quality, and once it detects a desired quality of service for predetermined amount of time, the method switches back to use of the IP network 190 as described in steps 1212, 1214, 1216 and 1218.

Figure 18:
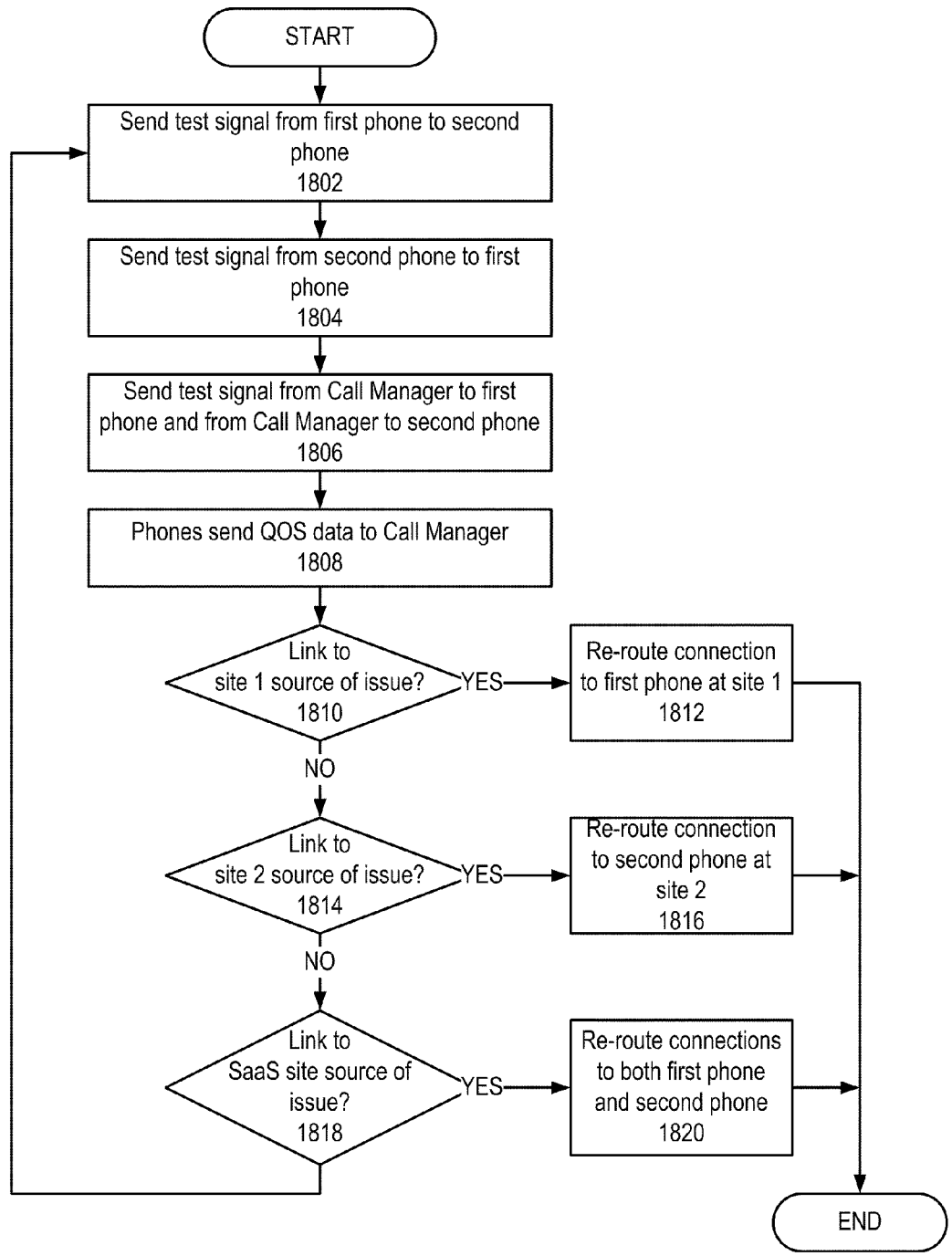
FIG. 18 is a flowchart illustrating a method for determining a source of call quality or connection issues is described below with reference to FIG. 18

Referring now to FIG. 18, a method for determining the source of call quality issues or connection issues is described. The method begins by sending 1802 a test signal from the first phone (first endpoint) to a second phone (second endpoint), the two endpoints of the call. For example, the first phone could send a ping to the second phone. In one embodiment, a ping or Internet Control Message Protocol (ICMP) echo signal is sent from the first phone to the second phone along with the Time To Live (TTL). The ping with TTL is commonly called a traceroute. TTL asks each gateway hop along the path to answer the ping, and gives a delay to each hop. An example traceroute is shown below:

Tracing route to DUBS [10.1.1.52] over a maximum of 30 hops:

| Hop | Delay | IP Address |
|---|---|---|
| 1 | <1 ms | 10.160.1.1 |
| 2 | <1 ms | 10.160.0.253 |
| 3 | 3 ms | 32.3.63.245 |
| 4 | 44 ms | 32.3.63.242 |
| 5 | 45 ms | 10.0.0.1 |
| 6 | 46 ms | DUBS [10.1.1.52] |

Trace complete.

The trace shows each "Hop" as an IP address. The intermediate hops are gateways, which might be Ethernet switches, routers, or end points. DUBS is the end point in this example. The method continues by sending 1804 a test signal from the second phone to the first phone. This is similar to the process described above but in the opposite direction. Next, the method sends 1806 a test signal from the call manager 150 to the first phone and from the call manager 150 to the second phone. In one embodiment, the call manager 150 in a manner similar to phone to phone communication uses a ping or an ICMP with TTL.

Thus, by doing traceroutes from the first phone, the call manager 150 in the cloud, and the second phone, the call manager 150 triangulates on where the problem is. If the connection issue is between the first phone and the cloud, the call manager 150 is able to successfully ping the second phone, and neither the first phone nor the call manager 150 can ping each other. The second phone in sending its traceroute to the call manager 150 confirms that the issue is near the first phone, and the first phone is moved to its bypass path (e.g., via cellular network 250). If the connection issue is between the second phone and the cloud, the call manager 150 is able to successfully ping the first phone, and neither the second phone nor the call manager 150 can ping each other. The first phone in sending its traceroute to the call manager 150 confirms that the issue is near the second phone, and the second phone is moved to its bypass path (e.g., via cellular network 250). If the connection issue is between the call manager 150 and the cloud (or both first phone and second phone have lost the connection to the cloud), the call manager 150 will not be able to successfully ping either the first phone or the second phone. The first phone and the second phone can ping each other, but the call manager 150 cannot ping either phone. In this case, both the first phone and the second phone are moved to their respective bypass paths (e.g., via cellular network 250) for IP media and call control. In the case that there is a problem within the cloud, the call manager 150 may not be able to ping one or both phones, and the phones may not be able to ping each other, the call manager 150 moves both phones to their respective bypass paths.

The method continues with the first phone and the second phone sending 1808 quality of service data to the call manager 150 along with the ping data. In a manner similar to that described above for triangulating a connection issue, the call manager 150 can triangulate the location of QoS and congestion issues between the second phone and the cloud or between the first phone and the cloud by reviewing the QoS data received from the first phone and the second phone. In one embodiment, the phones send Real-Time Transport Control Protocol (RTCP) quality of service data along with ICMP TTL data. The call manager 150 determines from the RTCP quality of service data when a call is starting to fail. Using the ICMP TTL data the call manager 150 determine which hop on the path that's the last hop in case of failure, or high latency if the network is congested. The method continues by determining 1810 whether the link to the first site is the source of congestion or failure. If so, the method continues to reroute 1812 the connection to the first phone at the first site 102 through the bypass path, after which the method is complete and ends. On the other hand, if the link to the first site is not the source of congestion or failure, the method continues to determine 1814 whether the link to the second site is the source of congestion or failure. If so, the method continues to reroute 1816 the connection to the second phone at the second site, after which the method is complete and ends. However, if the method determined that the link to the second site 104 was not the source of the issue, the method performs a final test to determine 1818 whether the link to the SaaS site 2002 is the source of the issue. In other words quality of service in the cloud has failed. If so, the call manager 150 cannot determine whether problem is so that moves both the first phone and the second phone to the bypass path where they communicate via cell phones.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

What is claimed is:

1. A computer-implemented method comprising:
   sending a first test signal to a first endpoint at a first site;
   sending a second test signal to a second endpoint at a second site;
   receiving quality of service data from the first endpoint;
   receiving quality of service data from the second endpoint;
   determining an issue with a connection based on the quality of service data received from the first endpoint and the second endpoint;
   responsive to determining the issue, determining whether a connection to the first site is a source of congestion;
   responsive to determining that the source of congestion is not the connection to the first site, determining whether a connection to the second site is the source of congestion; and
   routing the connection based on the determination of the source of congestion.

2. The method of claim 1, further comprising:
   in response to determining that the source of congestion is the connection to the first site, routing the connection to a bypass path.

3. The method of claim 1, further comprising:
   in response to determining that the source of congestion is the connection to the second site, routing the connection to a bypass path.

4. The method of claim 1, further comprising:
   in response to determining that the source of congestion is not the connection to the second site, determining whether a connection to a third site is the source of congestion.

5. The method of claim 4, further comprising:
   in response to determining that the source of congestion is the connection to the third site, routing the connection to a bypass path.

6. The method of claim 4, further comprising:
   in response to determining that the source of congestion is not the connection to the third site, sending a subsequent test signal.

7. The method of claim 4, wherein the third site is a shared site.

8. The method of claim 4, wherein the third site is a Software as a Service (SaaS) site.

9. The method of claim 1, wherein sending the first and second test signals is performed by a call manager.

10. The method of claim 9, further comprising:
directing an initial test signal to be sent from the first endpoint at the first site to the second endpoint at the second site before sending, by the call manager, the first and second test signals.

11. The method of claim 9, further comprising:
directing an initial test signal to be sent from the second endpoint at the second site to the first endpoint at the first site before sending, by the call manager, the first and second test signals.

12. The method of claim 1, wherein the quality of service data is sent to a call manager.

13. A system comprising:
a processor, and;
a memory storing instructions that, when executed by the processor, cause the system to:
send a first test signal to a first endpoint at a first site;
send a second test signal to a second endpoint at a second site;
receive quality of service data from the first endpoint;
receive quality of service data from the second endpoint;
determine an issue with a connection based on the quality of service data received from the first endpoint and the second endpoint;
determine whether a connection to the first site is a source of congestion in response to determining the issue;
determine whether a connection to the second site is the source of congestion in response to determining that the source of congestion is not the connection to the first site and
route the connection based on the determination of the source of congestion.

14. The system of claim 13, wherein the memory also stores instructions that, when executed, cause the system to:
route the connection to a bypass path in response to determining that the source of congestion is the connection to the first site.

15. The system of claim 13, wherein the memory also stores instructions that, when executed, cause the system to:
route the connection to a bypass path in response to determining that the source of congestion is the connection to the second site.

16. The system of claim 13, wherein the memory also stores instructions that, when executed, cause the system to:
determine whether a connection to a third site is the source of congestion in response to determining that the source of congestion is not the connection to the second site.

17. The system of claim 16, wherein the memory also stores instructions that, when executed, cause the system to:
route the connection to a bypass path in response to determining that the source of congestion is the connection to the third site.

18. The system of claim 16, wherein the memory also stores instructions that, when executed, cause the system to:
send a subsequent test signal in response to determining that the source of congestion is not the connection to the third site.

19. The system of claim 13, wherein the quality of service data is sent to a call manager.

20. A non-transitory computer readable medium including a computer readable program, wherein the computer readable program when executed on a computer causes the computer to:
send a first test signal to a first endpoint at a first site;
send a second test signal to a second endpoint at a second site;
receive quality of service data from the first endpoint;
receive quality of service data from the second endpoint;
determine an issue with a connection based on the quality of service data received from the first endpoint and the second endpoint;
determine whether a connection to the first site is a source of congestion in response to determining the issue;
determine whether a connection to the second site is the source of congestion in response to determining that the source of congestion is not the connection to the first site; and
route the connection based on the determination of the source of congestion.

21. The computer readable medium of claim 20, wherein the computer readable program when executed on a computer further causes the computer to:
determine the source of congestion includes determining whether a connection to a third site is the source of congestion; and
route the connection to a bypass path in response to determining that the source of congestion is the connection to the third site.

22. The computer readable medium of claim 20, wherein the quality of service data is sent to a call manager.

23. The computer readable medium of claim 21, wherein the third site is a shared site.

24. The computer readable medium of claim 21, wherein the third site is a Software as a Service (SaaS) site.

* * * * *